US006531214B2

(12) United States Patent
Carter et al.

(10) Patent No.: US 6,531,214 B2
(45) Date of Patent: Mar. 11, 2003

(54) REPLACEMENT FOR PLASTICIZED POLYVINYL CHLORIDE

(75) Inventors: Brandt K. Carter, Woodbury, MN (US); Buren R. Ree, Stillwater, MN (US); Osei A. Owusu, Woodbury, MN (US); Mark E. Napierala, St. Paul, MN (US)

(73) Assignee: 3M Innovative Properties Company, St. Paul, MN (US)

( * ) Notice: Subject to any disclaimer, the term of this patent is extended or adjusted under 35 U.S.C. 154(b) by 0 days.

(21) Appl. No.: 09/783,356

(22) Filed: Feb. 14, 2001

(65) Prior Publication Data

US 2002/0155283 A1 Oct. 24, 2002

(51) Int. Cl.⁷ .................................................. B32B 7/02
(52) U.S. Cl. ...................... 428/336; 428/523; 525/55; 525/185; 526/348.1
(58) Field of Search ...................... 428/523, 352, 428/353, 354, 364, 910; 525/55, 88, 89, 95, 185, 242, 410; 526/348.1, 352, 352.2

(56) References Cited

U.S. PATENT DOCUMENTS

| 3,278,646 A | 10/1966 | Lambert et al. ............ 260/897 |
| 3,341,626 A | 9/1967 | Peterkin ..................... 260/897 |
| 3,361,849 A | 1/1968 | Cramer et al. .............. 260/897 |
| 3,565,985 A | 2/1971 | Schrenk et al. ............. 264/271 |
| 3,666,836 A | 5/1972 | John .......................... 260/897 |
| 3,983,206 A | 9/1976 | Juba et al. .................. 264/255 |
| 4,020,194 A | 4/1977 | McIntyre et al. ........... 427/172 |
| 4,032,493 A | 6/1977 | Pascual ...................... 260/897 |
| 4,048,376 A | 9/1977 | Unmuth ...................... 428/461 |
| 4,081,415 A | 3/1978 | Matubara et al. .......... 260/28.5 |
| 4,115,620 A | 9/1978 | Gupta et al. ................ 428/374 |
| 4,279,659 A | 7/1981 | Unmuth ...................... 106/230 |
| 4,289,831 A | 9/1981 | Last ........................... 428/515 |
| 4,394,235 A | 7/1983 | Brandt et al. ............... 204/165 |
| 4,692,370 A | 9/1987 | Reckziegel et al. ......... 428/198 |
| 4,786,533 A | 11/1988 | Crass et al. |
| 4,999,231 A | 3/1991 | Fowler ......................... 428/95 |
| 5,047,462 A | 9/1991 | Kehr et al. .................. 524/423 |
| 5,085,943 A | 2/1992 | Crighton et al. ............ 428/500 |
| 5,091,237 A | 2/1992 | Schloegl et al. ............ 428/215 |
| 5,112,674 A | 5/1992 | German et al. ............. 428/216 |
| 5,128,183 A | 7/1992 | Buzio ........................ 428/35.7 |
| 5,132,074 A | 7/1992 | Isozaki ....................... 264/564 |
| 5,171,628 A | 12/1992 | Arvedson et al. .......... 428/224 |
| 5,194,113 A | 3/1993 | Lasch et al. |
| 5,212,009 A | 5/1993 | Peiffer et al. ............... 428/220 |
| 5,213,744 A | 5/1993 | Bossaert .................... 264/171 |
| 5,248,719 A | 9/1993 | Kehr et al. .................. 524/423 |

(List continued on next page.)

FOREIGN PATENT DOCUMENTS

| EP | 0 399 792 A3 | 11/1990 |
| EP | 0 399 792 A2 | 11/1990 |
| EP | 0 557 573 A2 | 9/1993 |
| EP | 0 763 422 A1 | 3/1997 |
| EP | 0 681 914 B1 | 2/1998 |
| JP | HEI 2000-273250 | 10/2000 |
| WO | WO 98/38041 | 9/1998 |
| WO | WO 98/44065 | 10/1998 |
| WO | WO 99/02331 | 1/1999 |
| WO | WO 99/28128 | 6/1999 |
| WO | WO 99/51432 | 10/1999 |
| WO | WO 00/05305 | 2/2000 |

*Primary Examiner*—Robert Dawson
*Assistant Examiner*—Christopher Keehan
(74) *Attorney, Agent, or Firm*—Carolyn A. Bates

(57) ABSTRACT

A blend comprising polyolefin and hydrocarbon resin, wherein the polyolefin is semicrystalline and has a suitable degree of crystallinity and molecular weight, or the polyolefin is amorphous and has sufficiently high molecular weight, and sufficient hydrocarbon resin is present in the blend, so that a film made from the blend is substantially vinyl-like and non-elastomeric. Some of the films are also conformable, drapable or affinely deformable by hand.

61 Claims, 12 Drawing Sheets

U.S. PATENT DOCUMENTS

| | | | |
|---|---|---|---|
| 5,290,635 A | | 3/1994 | Matsumura et al. ......... 428/516 |
| 5,316,838 A | * | 5/1994 | Crandall et al. ............. 428/283 |
| 5,389,324 A | | 2/1995 | Lewis et al. ................. 264/171 |
| 5,427,842 A | | 6/1995 | Bland et al. ................. 428/213 |
| 5,451,455 A | | 9/1995 | Peiffer et al. ................ 425/323 |
| 5,460,861 A | | 10/1995 | Vicik et al. ................. 428/34.9 |
| 5,472,764 A | | 12/1995 | Kehr et al. ................... 428/96 |
| 5,543,223 A | | 8/1996 | Shah ........................ 428/349 |
| 5,560,948 A | | 10/1996 | Peiffer et al. ............... 426/515 |
| 5,589,122 A | | 12/1996 | Leonard et al. ............. 264/146 |
| 5,599,602 A | | 2/1997 | Leonard et al. ............... 428/56 |
| 5,660,922 A | | 8/1997 | Herridge et al. ............. 428/214 |
| 5,721,086 A | | 2/1998 | Emslander et al. ......... 430/126 |
| 5,777,055 A | | 7/1998 | Peiffer et al. ............ 526/348.1 |
| 5,941,655 A | | 8/1999 | Jacobs et al. |
| 6,074,719 A | | 6/2000 | Fukushi et al. |
| 6,106,982 A | | 9/2000 | Mientus et al. ................ 430/14 |
| 6,156,252 A | | 12/2000 | Freedman ............... 264/173.15 |
| 6,180,229 B1 | * | 1/2001 | Becker et al. ........ 428/355 BL |
| 6,288,149 B1 | * | 9/2001 | Kroll ........................... 524/81 |
| 6,329,468 B1 | * | 12/2001 | Wang ........................ 525/240 |

\* cited by examiner

REPLACEMENT FOR PLASTICIZED POLYVINYL CHLORIDE

TECHNICAL FIELD

This invention relates to films and fibers, and to materials that can serve as substitutes for plasticized polyvinyl chloride (PVC).

BACKGROUND OF THE INVENTION

Plasticized PVC films and tapes are conventionally used for a wide variety of applications including graphic films, retroreflective sheeting, and auto paint masking. PVC has many advantages that have caused it to become a material of choice in such applications. For example, plasticized PVC films can readily be applied to many irregular surfaces. Thus a PVC-based graphic film or retroreflective sheet can be heated slightly above room temperature and stretched over rivets and into small indentations such as may be present on the substrates to which such graphic films or retroreflective sheets may be applied. Many materials that have been tried as substitutes for PVC have been found to undergo necking or other non-affine deformation when stretched, thus rendering such materials unsuitable for applications in which non-uniform distortion during stretching would be unacceptable.

Plasticizers are typically employed in PVC films in order to make the films more flexible and more stretchable. However, plasticizers can migrate to the substrate on which PVC films are adhered, leaving a residue or "ghosting" when removed. In some cases the ghosting is not removable with solvent wipes. Thus, the exterior appearance of an automobile may be detrimentally affected when PVC films are used as the tape backing in auto paint masking tapes. Furthermore, PVC plasticizers can degrade the performance of adjacent adhesive layers, reducing the adherence of a tape to an automobile, or a graphic to a substrate. PVC plasticizers can also migrate into and thereby degrade the performance of retroreflective sheeting.

In addition, there is growing concern, particularly in European and Japanese markets, about the environmental impact of land filling or incinerating PVC materials. PVC has only limited recycling utility.

A variety of stiff, relatively high modulus packaging films (e.g., twist films for candy wrapping) have been made from isotactic (crystalline) polypropylene and hydrocarbon resins, including the films described in U.S. Pat. Nos. 3,278,646; 3,361,849; 3,666,836; 4,032,493; 4,289,831; 4,394,235; 5,091,237; 5,128,183; 5,212,009; 5,213,744; 5,246,659; 5,290,635; 5,451,455; 5,543,223; 5,560,948 and 5,777,055; and in European Patent Specification No. EP 0 681 914 B1. U.S. Pat. No. 5,085,943 also describes a twist film made from polypropylene and hydrocarbon resin, the film being said to have increased stiffness. PCT International Application Nos. WO 98/38041, WO 99/2331 and WO 99/51432 describe multilayer films having a core layer that contains isotactic propylene and various modifiers including atactic polypropylene. European Patent Specification No. EP 0 763 422 A1 refers to various multilayer films containing low-modulus polypropylene in an interior layer, and refers to but does not exemplify film layers containing a blend of low-modulus polypropylene and hydrocarbon resin.

Fibers made from isotactic polypropylene and hydrocarbon resins are described in, for example, U.S. Pat. Nos. 4,115,620 and 5,171,628, and in European Patent Application No. 0 399 792 A3.

Hot melt adhesives, sealants and other compositions containing, inter alia, atactic (amorphous) polypropylene and various hydrocarbon resins are described in many references, including U.S. Pat. Nos. 3,341,626; 3,983,206; 4,048,376; 4,081,415 and 4,279,659. U.S. Pat. No. 4,999,231 describes cast hot melt adhesive films for use on carpet backing, wherein the films contain, inter alia, atactic polypropylene, hydrocarbon resin and calcium carbonate filler. U.S. Pat. No. 4,692,370 describes a fibrous coating made from blown strands of a hot melt material made from, inter alia, atactic polypropylene and a polyterpene resin. U.S. Pat. Nos. 5,047,462; 5,248,719 and 5,472,764 describe coating compositions containing, inter alia, various atactic copolymers and hydrocarbon resin. European Patent Application No. 0 557 593 A2 describes packaging films containing, inter alia, a hydrocarbon resin and a wax. Atactic polypropylene is mentioned as one possible wax.

PVC replacement films are described in, for example, U.S. Pat. Nos. 5,112,674; 5,132,074 and 5,460,861.

SUMMARY OF THE INVENTION

The present invention provides, in one aspect, a blend comprising polyolefin and hydrocarbon resin, wherein the polyolefin is semicrystalline and has a suitable degree of crystallinity and molecular weight, or the polyolefin is amorphous and has sufficiently high molecular weight, and sufficient hydrocarbon resin is present in the blend, so that a film made from the blend is substantially vinyl-like and non-elastomeric. In other embodiments, films made from such a blend are also conformable, drapable or affinely deformable by hand.

In another aspect, the invention provides films and fibers made from the above-mentioned blend.

In another aspect, the invention provides multilayer films and fibers comprising a core of the above-mentioned blend and one or more additional layers made of a different material.

The invention provides, in yet another aspect, a vinyl-like non-elastomeric film comprising a blend of hydrocarbon resin together with semicrystalline or amorphous polyolefin, or a mixture thereof. In a preferred embodiment, the polyolefin comprises an ethylene or propylene copolymer, a mixed tacticity polypropylene, or a blend thereof.

The invention also provides a method for making a plasticized-PVC-like film comprising blending, extruding and optionally orienting a mixture comprising polyolefin and hydrocarbon resin, wherein the polyolefin is semicrystalline and has a suitable degree of crystallinity and molecular weight, or the polyolefin is amorphous and has sufficiently high molecular weight, and wherein sufficient hydrocarbon resin is present in the blend, so that a film made from the mixture is substantially vinyl-like and non-elastomeric. In other embodiments, the films are also conformable, drapable or affinely deformable by hand. In yet other embodiments, the films are oriented sufficiently so that the film has a deformation index (as defined below) that is less than about 1.1.

The invention provides films having vinyl-like features and behavior. The blends and method of the invention can be tailored to provide specific desired physical properties at room temperature (20° C.) and at elevated temperatures, and can provide workable substitutes for existing plasticized PVC films and fibers. At present raw material pricing, the invention enables a desirable reduction in raw material cost compared to the use of many PVCs.

DETAILED DESCRIPTION

Figure 1:
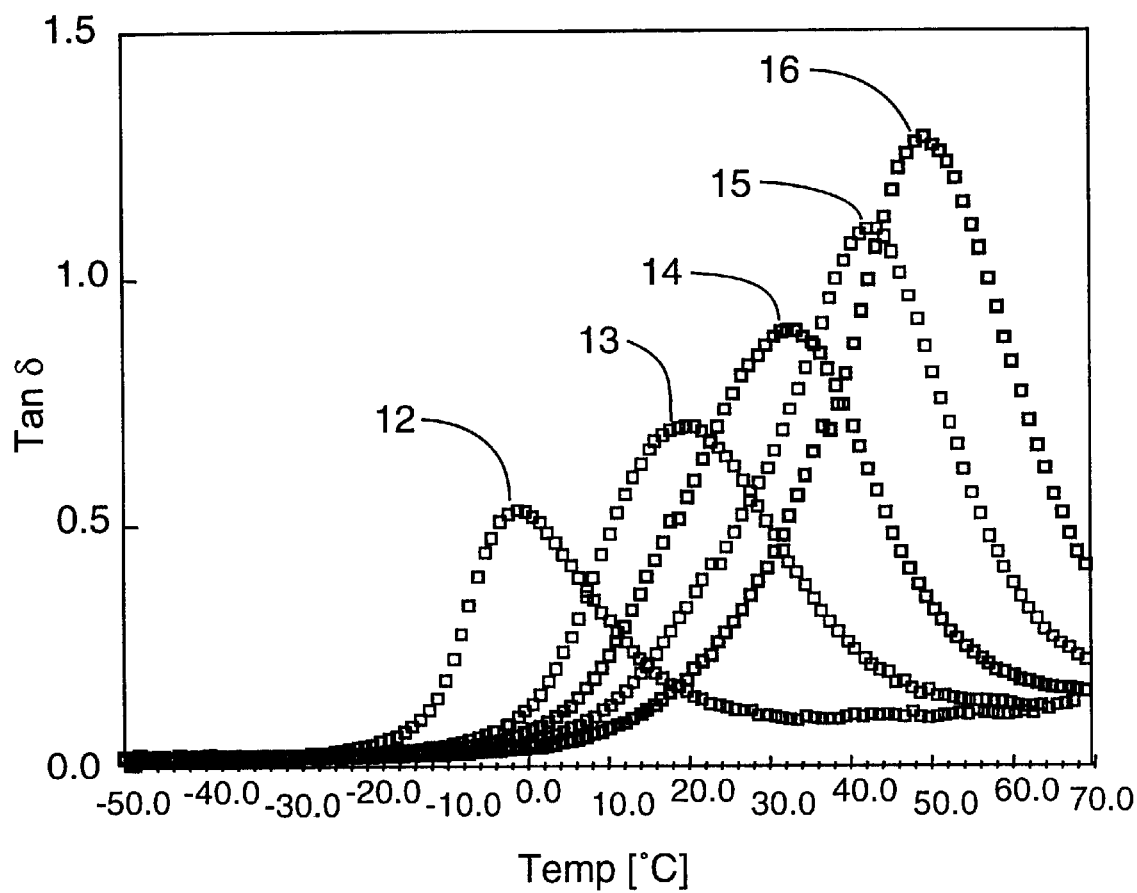
FIG. 1 is a graph illustrating Tan δ vs. temperature for various blends of polyolefin and hydrocarbon resin.

We have observed that the measured physical properties of some blends of the invention may change shortly after the blend is prepared. Thus we prefer to measure such properties by forming the blend, processing it into a film, and then waiting at least another 7 to 10 days (more preferably at least about 1000 hours) before performing physical property measurements. Usually we desire to form the blends and then immediately process the blend into a finished shape such as a film or fiber. However, because of the changing nature of the physical properties of some blends of the invention, it may be desirable in some cases to form the blends, wait for a suitable time so that the physical properties of the blend reach a desired state and process the blend into a finished shape.

As used in connection with this invention, the terms "vinyl-like" and "non-elastomeric" will be used to refer to the characteristics of a film sample having a thickness of about 0.05 to 0.1 mm, aged at least 7 to 10 days as described above. These characteristics can be evaluated by hand at room temperature. For example, a film sample can be evaluated to determine if it is substantially "vinyl-like" by placing a film sample between a thumb and index finger and flexing or otherwise feeling the film sample to detect whether it resembles a plasticized PVC film sample of similar caliper. A film sample can be evaluated to determine if it is "non-elastomeric" by marking two spaced fiducial marks on the film sample, elongating the film sample until the length between the fiducial marks doubles (or in other words, until the sample has been elongated by 100%), allowing the elongated sample to relax unrestrained (e.g., on a bench top), and measuring the length between the fiducial marks after 5 minutes. For a non-elastomeric film sample, the length between the fiducial marks will be at least 150% of the original length after five minutes. For some blends or methods of the invention, the film sample will undergo further relaxation and the length between the fiducial marks will be less than 150% of the original length after 24 hours. Such further relaxation is not required, however, and for a preferred subclass of the blends and methods of the invention the length between the fiducial marks will remain at least 150% of the original length after 24 hours.

Some embodiments of the invention provide films that are also conformable, drapable, affinely deformable, or any combination of these characteristics. These terms will be used to refer to the characteristics of a film sample having a thickness of about 0.05 to 0.1 mm, aged at least 7 to 10 days as described above. These characteristics can also be evaluated by hand at room temperature. A film sample can be evaluated to :determine whether it is substantially "conformable" by holding a 10 cm square piece of ;the film sample taut and attempting to push a thumb through the film sample, without rupturing the film sample, to determine whether at least a 2 cm deep, substantially conforming thumb indentation can be made in the film and whether at least a 1 cm deep indentation will remain just after the thumb is removed. A film sample can be evaluated to determine whether it is substantially "drapable" by hanging a 5 mm wide and 10 cm long piece of the film sample over a horizontally-extended index finger to detect whether the ends of the film sample hang vertically. A film sample can be evaluated to determine whether it is substantially "affinely deformable" by grasping the ends of a 1 cm wide and 10 cm long film sample and pulling the ends of the film sample apart for approximately 5 cm to determine whether the film sample will deform without the occurrence of a visible neck or cold draw zone that localizes the deformation. Affine deformation is further explained in F. Rodriguez, Principles of Polymer Systems, p. 199 (McGraw Hill, 1970) as follows: "When we stretch the whole piece of rubber, we move the ends of the segment to new positions in the same proportion as we do the whole piece."

The above-described characteristics can also be evaluated using film samples having other calipers if desired. Those skilled in the art will understand that if a film sample with a caliper greater than 0.1 mm has one or more of the above characteristics then films with a caliper of about 0.1 mm will likely do so as well. Those skilled in the art will also appreciate that the desired caliper of a film of the invention will vary depending upon the intended application, and that films having a variety of calipers can be employed, including films whose calipers are less than 0.05 mm or greater than 0.1 mm.

A variety of polyolefins can be used in the invention. Preferably the polyolefin is a polymer of a monomer or a copolymer of monomers having at least two carbon atoms. Polyolefins for use in the invention can include more than one type of structure throughout their chain length. For example, the polyolefin can include stereoregular isotactic or syndiotactic structures, as well as amorphous, atactic structures, or combinations thereof. "Isotactic" polymers, as defined by Hawley's Condensed Chemical Dictionary (12th Edition), are those whose structure is such that groups of atoms that are not part of the backbone structure are located either all above, or all below, atoms in the backbone chain, when the latter are all in one plane. "Syndiotactic" polymers, as defined by Hawley's Condensed Chemical Dictionary (12th Edition), are those whose structure is such that groups of atoms that are not part of the backbone structure are located in some symmetrical and recurring fashion above and below the atoms in the backbone chain, when the latter are all in one plane. "Atactic" polymers, as defined by *Hawley's Condensed Chemical Dictionary* (12<sup>th</sup> Edition), are those whose structure is such that groups of atoms are arranged randomly above and below the backbone chain of atoms, when the latter are all in one plane. It is generally understood that substantially atactic polymers are amorphous, and lack a well-defined crystalline melting point.

Neither highly stereoregular isotactic or syndiotactic nor highly atactic polyolefins are desired for use in the present invention. Use of excessively stereoregular (highly crystalline) polyolefins will make films or fibers containing such polyolefins overly stiff and inflexible, thus detracting from the desired vinyl-like behavior. Unless the molecular weight of the polymer is sufficiently high, use of excessively amorphous polyolefins will make films or fibers containing such polyolefins excessively soft and weak. Thus the polyolefin should be sufficiently semicrystalline and of a suitable molecular weight, or the polyolefin should be amorphous and of should be of sufficiently high molecular weight, so that a film made from the polyolefin and the hydrocarbon resin is substantially vinyl-like and non-elastomeric as described above. The required degrees of crystallinity (in the case of a semicrystalline material) and molecular weight (in the case of a semicrystalline or amorphous material) will depend in part on the relative amounts and type of polyolefin and hydrocarbon resin employed. It will also depend on whether orientation is employed, since as discussed in more detail below, for some blends the use of orientation will enable an otherwise brittle blend to be processed into a substantially vinyl-like and non-elastomeric film or fiber.

Polyolefins for use in the invention include polyethylenes or polypropylenes such as ethylene or propylene copolymers, mixed tacticity polypropylenes, ethylene/propylene copolymers, ethylene/propylene/1-butene terpolymers, ethylene/butene copolymers (e.g., ethylene/1-butene copolymers), propylene/butene copolymers (e.g., propylene/1-butene copolymers), ethylene/hexene copolymers, ethylene/octene copolymers, ethylene/methyl acrylate and ethylene/styrene copolymers. Preferred polyolefins include those known as "Flexible Polyolefin" ("FPO") or "Thermoplastic Polyolefin" ("TPO") alloys, such as the REXFLEX™ FPO 100, 200 and 300 series polypropylenes and REXFLEX™ WL203 polypropylene (formerly available from Huntsman Corp.); ADFLEX™ thermoplastic polyolefins and Polybutene 1710A from Basell Polyolefins; ATTANE™, AFFINITY™ and INDEX™ ethylene copolymers from Dow Chemical Co.; EASTOFLEX™ atactic polypropylene or propylene/ethylene copolymers from Eastman Chemical Products; ENGAGE™ polyolefins from DuPont Dow Elastomers; EXACT™ ethylene copolymers such as the D201 through 9018 series copolymers from Exxon Chemical Products; "EOD" series syndiotactic propylenes such as EOD 9628, "Type 4280" modified polypropylene and Z9470 propylene/ethylene copolymer from Fina Oil and Chemical Co.; VESTOPLAST™ ethylene/propylene/butene copolymers from Creanova Inc., a subsidiary of Degussa-Huls Corp.; and blends thereof.

A variety of hydrocarbon resins can be used in the invention. Suitable hydrocarbon resins have an aliphatic, aromatic or mixed aliphatic and aromatic structure. Normally the hydrocarbon resin will contain some degree of unsaturation. However, the hydrocarbon resin can be fully or partially hydrogenated in order to alter the degree of unsaturation and other properties of the hydrocarbon resin such as its Tg or its thermal oxidative stability. The polymerization conditions or other process parameters can also be varied to alter resin properties such as color, molecular weight, melt viscosity and the like. Suitable hydrocarbon resins include the PICCO™, PICCODIENE™ and PICCOVAR™ series of aromatic hydrocarbon resins (e.g., PICCO 1104, 2100, 5120, 5140, 6085 and 6100; PICCODIENE 2215; and PICCOVAR AP10 and AP25); the PICCOTAC™ and PICCOPALE™ series of aliphatic hydrocarbon resins (e.g., PICCOTAC 95 and 115; and PICCOPALE 100); the ADTAC™ series of liquid aliphatic hydrocarbon resins (e.g., ADTAC LV); the HERCOTAC™, MBG™ and PICCOLYTE™ series of mixed aromatic and aliphatic hydrocarbon resins (e.g., HERCOTAC AD1115, AD4100, 1148 and 1149; MBG223; and PICCOLYTE HM90, HM106 and C135); the REGALITE™, REGALREZ™ and "DCPD" (dicyclopentadiene) series of partially or fully hydrogenated hydrocarbon resins (e.g., REGALITE V1100, V1120, V3100; V3120, R1090, R1100, R1125, R5100, R7100S, T1090, T1105, T1125 and T1140; and REGALREZ 1018, 1085, 1094, 1126, 1128, 1139, 3102 and 6108); the HERCOLITE™, KRISTALEX™, PICCOTEX™, PICCOLASTIC™ and ENDEXT™ series of styrene or methylstyrene "pure monomer" hydrocarbon resins (e.g., KRISTALEX 1120, 3070, 3085, 3100, 3115 and 5140; PICCOTEX 75, LC, 100 and 120; PICCOLASTIC A5, A75 and D125; ENDEX 155 and 160; and HERCOLITE 240 and 290) and the PICCOLYTE™ series of terpene resins, all of which are commercially available from Hercules, Inc.; ARKON™ hydrocarbon resins from Arakawa Chemical; hydrocarbon resins from Arizona Chemical Co.; ESCOREZ™ hydrocarbon resins from Exxon Chemical Co.; hydrocarbon resins from Ferguson & Menzies; WING-TACK™ hydrocarbon resins from Goodyear Chemical; CLEARON™ hydrocarbon resins from Yasuhara Yushi Kogyo; and blends thereof.

Sufficient hydrocarbon resin should be employed so that a film made from the material is substantially vinyl-like and non-elastomeric as described above. The required amount of hydrocarbon resin will depend in part on the amount and type of polyolefin and the type of hydrocarbon resin employed. As a general guide, blends containing at least about 10 wt. %, more preferably at least about 20 or even about 30 wt. %, and most preferably from about 40 wt. % to about 60 wt. % hydrocarbon resin are preferred. At higher hydrocarbon resin contents (e.g., above about 50 wt. %), and depending upon the materials employed, unoriented or only slightly oriented films may exhibit poor (e.g., weak) mechanical properties. However, films containing such higher hydrocarbon resin contents that have been oriented using sufficiently high orientation ratios (e.g., 3×3 or greater) will have improved mechanical properties. The term "orientation ratio" refers to the ratio of the length of a film specimen after stretching to the length of the same specimen prior to its being stretched. Orientation ratios specified in a format such as "3×3" refer to biaxial orientation wherein the indicated orientation ratios are in each of two, usually perpendicular, directions.

Preferably the blend of polyolefin and hydrocarbon resin is "compatible". By this is meant that the blend does not exhibit gross phase separation when viewed using an unaided human eye at room temperature. Compatibility can also be said to be present when the blend exhibits a single Tg or single melting temperature, or when a film made from the blend does not contain discontinuous phase regions (other than crystallites of the polyolefin) having a diameter greater than about 100 nanometers, more preferably not greater than about 20 nanometers, as measured using Scanning Electron Microscopy. Thus a film sample formed from the blend preferably will be substantially clear (e.g., transparent) and substantially free of significant haze or other evidence of gross phase separation. However, the blend need not be completely compatible. In some instances, partially miscible blends may be preferred over fully compatible blends, as a partially miscible blend can exhibit a small secondary Tg peak, and consequently can have broadened use temperatures (e.g., increased low temperature flexibility) compared to a fully compatible blend. In some instances, partially miscible polyolefin mixtures which by themselves exhibit some evidence of incompatibility, will exhibit reduced incompatibility when they are blended with one or more hydrocarbon resins.

For some applications, the articles of the invention form conformable films. Conformability can be evaluated by hand as described above, or by applying circular pieces of film to a 150 mm diameter hemispherical mandrel. Preferably for a conformable film, a film sample of at least 100 mm diameter, more preferably at least 120, and most preferably of at least 140 mm diameter can be applied to the mandrel at room temperature without wrinkling.

For some applications, the articles of the invention form drapable films. Drapability can be eluated by hand as described above, or by measuring tensile modulus. Tensile modulus is a measure of the stiffness of an article. The tensile modulus of commercially available plasticized PVC materials varies, but for premium grades of plasticized PVC, tensile modulus generally ranges between about 100 and about 1000 MPa at room temperature. Tensile modulus can be evaluated using a tensile to break test as described below in Example 2. The blends of polyolefin and hydrocarbon resin used in the present invention desirably have a sufficiently low tensile modulus so that a film made from the blend will behave like plasticized PVC. Above a sufficiently high orientation ratio (e.g., above about 2×2 or 3×3 orientation), orientation tends to increase the tensile modulus of the oriented blend. However, when compared to the polyolefin alone, the tensile modulus of the blend tends to be stiffer (higher modulus) at lower temperatures and more supple (lower modulus) at elevated temperatures. These characteristics facilitate the manufacture of films having a tensile modulus that mimics the temperature-dependent behavior of plasticized PVC films. For example, by tailoring the amount of hydrocarbon resin and the orientation ratio, the blends of the present invention can be used to fabricate thin graphic films that are sufficiently stiff at room temperature so that they can easily be applied to a substrate, while being sufficiently conformable at slightly elevated temperatures (e.g., by heating the film with a heat gun) so that the films can be coaxed into conformity with surface irregularities in the substrate (e.g., rivets and corrugations on the sides of truck panels). These characteristics are very desirable for graphic and other films, and are very difficult to mimic using other polymers or polymer blends. The perceived stiffness of such a film will be proportional to its tensile modulus and to the cube of the film thickness. Preferably, the film has a tensile modulus less than about 1400 MPa, more preferably between about 10 MPa and about 700 MPa, and most preferably between about 300 and about 650 MPa when measured at room temperature.

For some applications, the articles of the invention form films that are affinely deformable by hand as described above. Affine deformation behavior can be characterized in a variety of ways. For example, the yield behavior of an article can be measured using a stress-strain test, such as is used in Example 2 and shown in FIG. 4a. In general, the yield point is the stress value at which an article undergoes pronounced plastic deformation upon further application of strain. In non-affine deformation, the yield point is manifested in a stress-strain plot as the first point where an increase in strain occurs without an increase in stress. This typically represents a local maximum in the stress-strain curve just as the sample begins to undergo locally non-uniform elongation. Curve 40 in FIG. 4a shows non-affine deformation. Point 43 is the observed yield point for curve 40. In affine deformation, the stress-strain curve typically does not exhibit a local maximum, but instead exhibits stress that increases throughout the course of deformation. Usually, such a curve will exhibit a profound change in slope at some level of strain. That inflection point typically is deemed to be the yield point for an affinely deformable material. Curve 42 in FIG. 4a shows affine deformation. Point 46 is the inflection point and deemed yield point for curve 42.

The yield stress is the stress at the observed or deemed yield point. For non-affine deformation, the draw stress is the local minimum in stress just after the observed yield point. The vertical height of point 43 in FIG. 4a shows the yield stress for curve 40, and the vertical height of point 44 shows the draw stress for curve 40. For affine deformation there is no local minimum in stress after the deemed yield point, and thus no draw stress.

The yield strain is the strain at the observed or deemed yield point. For non-affine deformation, the draw strain is the strain after the observed yield point at which the stress again equals the yield stress. The horizontal extent of point 43 in FIG. 4a shows the yield strain for curve 40, and the horizontal extent of point 45 shows the draw strain for curve 40. For affine deformation there is no local minimum in strain after the deemed yield point, and thus no draw strain.

The "necking index" is the ratio of draw strain to yield strain, and is a number greater than or equal to one. For affine deformation the necking index is deemed to be equal to one.

The "deformation index" is the ratio of yield stress to draw stress, and is a number greater than or equal to one. For affine deformation the deformation index is deemed to be equal to one.

The necking index and deformation index both serve as a measure of deformation non-uniformity. Either index can be used to characterize a material. In the discussion that follows, we will focus on the deformation index. As the deformation index approaches one, deformation of the article becomes more affine. The deformation index of commercially available plasticized PVC materials varies, but for premium grades of plasticized PVC, the deformation index generally ranges between about 1.0 and about 1.1 at room temperature. The blends of polyolefin and hydrocarbon resin used in the present invention desirably have a sufficiently low deformation index so that a film made from the blend will exhibit affine deformability. The addition of the hydrocarbon resin to the polyolefin tends to increase the deformation index of the blend, and orientation tends to decrease the deformation index of the oriented blend. These characteristics facilitate the manufacture of films having a deformation index that mimics the affine deformation behavior of plasticized PVC films. Attainment of affine deformation properties is especially difficult, and of particular importance for graphic and retroreflective films and for automotive masking tape. For example, when stretching graphic films onto irregular surfaces, the printed graphic should not be severely distorted and the intended visual appearance of the graphic should be preserved. By tailoring the amount of hydrocarbon resin and the orientation ratio, the blends of the present invention can be used to fabricate films that deform affinely while preserving a desirable viscoelastic response of high stress relaxation and low strain recovery. This behavior facilitates manufacture of films having dead stretch hand properties and permanent set characteristics like that exhibited by plasticized PVC. These characteristics are very desirable for graphic and other films, and are very difficult to mimic using other polymers or polymer blends. Preferably, the blend has a deformation index below about 1.2, more preferably below about 1.1, and most preferably is equal to about 1.0.

For some applications, the articles of the invention form films that exhibit "dead stretch" characteristics. By dead stretch we mean that when an article (e.g., a film) of the invention is stretched past its yield point it will evenly deform, and upon removal of the stress will substantially retain its deformed configuration and exhibit minimal recovery. Dead stretch behavior can also be evaluated by hand or by using instruments. When using instruments, dead stretch can conveniently be characterized by measuring residual stress and strain recovery values. Both residual stress and strain recovery are time- and temperature-dependent material properties. Residual stress is a measure of the stress retained by an article that has been stretched by 100% (100% strain) and held in the stretched position for one minute. Strain recovery is a time- and temperature-dependent measure of the extent to which the stretched article returns toward its original length upon release of the stress. The residual stress and strain recovery values of commercially available plasticized PVC materials vary, but for some premium grades of plasticized PVC, residual stress generally ranges between about 3 and about 10 MPa after 60 seconds at room temperature, and strain recovery generally ranges between about 65 and about 98% after 24 hours at room temperature. The blends of polyolefin and hydrocarbon resin used in the present invention desirably have residual stress and strain recovery values that are selected so that a film made from the blend will behave like plasticized PVC. As a generalization for films of the invention, the residual stress and strain recovery values will vary independently. In other words, changes that cause the residual stress value to increase will often (but not always) cause the strain recovery value to decrease. However, we have found that addition of the hydrocarbon resin to the polyolefin changes the relaxation behavior of the blend at 100% strain in a nonlinear fashion. At lower hydrocarbon resin addition levels, residual stress increases when the orientation ratio is increased. However, at sufficiently high hydrocarbon resin addition levels and sufficiently high orientation ratios, residual stress decreases as the hydrocarbon resin content is increased. Strain recovery tends to decrease as the hydrocarbon resin addition level is increased. This behavior facilitates the manufacture of films having a combination of residual stress and strain recovery values that can closely mimic the behavior of a variety of plasticized PVC films. These characteristics are very desirable for graphic and other films, and are very difficult to mimic using other polymers or polymer blends. Preferably, the blend has a residual stress after 60 seconds at room temperature that is less than about 20 MPa, more preferably less than about 15 MPa, and most preferably less than about 5 MPa. Preferably, the blend has a strain recovery after 24 hours at room temperature that is less than about 80%, more preferably less than about 60% and most preferably less than about 40%.

As a general guide for replacement of PVC in an intended use, the polyolefin, hydrocarbon resin, any optional additional materials and the processing conditions for the blend should be selected to provide an article whose properties will resemble or improve upon the desired PVC properties at the intended use temperature. The term "intended use temperature" refers to the temperature or range of temperatures to which the article will typically be exposed during use (e.g., after application to a substrate). In many cases, the intended use temperature will be room temperature. However, the article may be exposed to intended use temperatures considerably above or below room temperature, e.g., when a graphic film, retroreflective sheeting, automotive tape or other article is applied to a substrate outdoors, or subjected to extended exposure (e.g., one year or more) in outdoor conditions. Those skilled in the art will appreciate that due to the wide variety of potential intended uses and use temperatures, the selected properties can vary widely both in type and magnitude. For example, at room temperature a graphic film of the invention preferably has a tensile modulus of from about 50 to about 1400 MPa, more preferably about 300 to about 650 MPa; a residual stress after 60 seconds that is less than about 15 MPa, more preferably less than about 10 MPa; a strain recovery after 24 hours that is less than about 85%, more preferably less than about 75% after 24 hours; and a deformation index less than about 1.1, more preferably less than about 1.05 and most preferably equal to about 1.0. At room temperature, a tape backing of the invention preferably has a tensile modulus of from about 70 MPa to about 415 MPa, more preferably about 140 MPa to about 345 MPa; a residual stress (after being elongated by 100% at a 600%/min. rate and being held in the elongated position for 60 seconds) that is less than about 9 MPa, more preferably less than about 5 MPa; a strain recovery after 24 hours that is less than about 70%, more preferably less than about 50% after 24 hours; and a deformation index less than about 1.05, more preferably less than about 1.02 and most preferably equal to about 1.0. At room temperature, a retroreflective sheeting backing of the invention preferably has a tensile modulus of from about 10 to about 1000 MPa, more preferably about 15 to about 100 MPa. At the intended use temperature the articles of the invention preferably also have an elongation to break of at least about 80%, more preferably at least about 200% when evaluated using ASTM D882-95A.

Some blends of the invention have better non-blocking properties (that is, the ability to be formed into films or fibers that can be wound upon themselves and then unwound without adhering to adjacent film layers or fibers) than typical soft PVC films. This aids in roll processing (that is, manufacture on a substantially continuous basis using a web or strand that is wound and optionally unwound and rewound on a roll or rolls) of articles containing blends of the invention.

If desired, the films and fibers of the invention can have a multilayer construction. For example, the films and fibers can have a core comprising a blend of polyolefin and hydrocarbon resin and one or more additional (e.g., skin) layers made of a different polymeric material. The additional layers can provide desired surface, bulk or optical properties such as adhesion promotion, adhesive release, increased resistance to blocking, or improvements in properties such as ink receptivity, sewability, launderability, weldability, weathering resistance, scratch or abrasion resistance, solvent resistance, graffiti resistance, or light management (e.g., light scattering, reflection, refraction, polarization, gloss, antireflection, or coloration). The use of additional layers can also assist in reducing the overall cost of an article containing the blend. The additional layers can be the same as or different from one another. When melt processing multilayer films of the present invention, the materials in adjacent layers need not be completely chemically or physically compatible or well matched, particularly with respect to melt viscosities, although they can be so matched if desired. Thus although materials in adjacent polymeric flowstreams can have relative melt viscosities (a ratio of their viscosities) within a range of about 1:1 to about 1:2, they do not need to have such closely matched melt viscosities. Rather, the materials in adjacent polymeric flowstreams can have relative melt viscosities of at least about 1:5, and possibly up to about 1:50.

In a preferred method for making multilayer articles of the invention, the layers are formed at the same time, joined while in a molten state, and cooled. That is, preferably, the layers are substantially simultaneously melt-processed, and more preferably, the layers are substantially simultaneously coextruded. Articles formed in this way possess a unified construction and have a variety of useful applications. Such multilayer articles have a construction of at least 2 layers, more preferably at least 3 layers. If desired, the layers of multilayer articles can also be formed individually and later laminated together, or a layer can be formed as a moving web and subsequent layers cast thereon. A colored additional layer can be formed in a variety of ways, e.g., by adding a dye to the additional layer or by applying an ink or other suitable colorant to the surface of the additional layer. A layer can also be a separate layer such as a protective overlayer or a removable layer such as a release liner.

Representative additional layer materials include ethylene/vinyl acetate copolymers such as those available under the trade designation ELVAX™ from E.I. DuPont de Nemours, Inc.; modified ethylene/vinyl acetate copolymers such as those available under the trade designation BYNEL™ from E.I. DuPont de Nemours, Inc. (e.g., BYNEL 3101 acrylate-modified ethylene vinyl acetate having a 18 wt. % vinyl acetate content, and BYNEL 3860 anhydride-modified ethylene vinyl acetate); copolymers of ethylene and methyl acrylate such as that commercially available under the trade designation POLY-ETH 2205 EMA™ from Gulf Oil and Chemicals Co.; ethylene/(meth) acrylic acid copolymer such as that available under the trade designation SURLYN™ from E.I. DuPont de Nemours, Inc.; maleic anhydride modified polyolefins and copolymers of polyolefins such as that commercially available under the trade designation MODIC™ from Mitsubishi Chemical Co.; polyolefins containing homogeneously dispersed vinyl polymers such as those commercially available under the trade designation VMX™ from Mitsubishi Chemical Co. (e.g., FN-70, an ethylene/vinyl acetate based product having a total vinyl acetate content of 50% and JN-70, an ethylene/ vinyl acetate based product containing dispersed polymethylmethacrylate and having a vinyl acetate content of 23% and a methyl methacrylate content of 23%); POLYBOND™ (believed to be a polyolefin grafted with acrylic acid) from B.P. Chemicals Inc.; PLEXAR™ (believed to be a polyolefin grafted with functional groups) from Quantum Chemicals, Inc.; a copolymer of ethylene and acrylic acid such as that commercially available under the trade designation PRIMACOR™ from Dow Chemical Co.; a copolymer of ethylene and methacrylic acid such as that commercially available under the trade designation NUCREL™ from E.I. DuPont de Nemours, Inc.; a copolymer of ethylene and methyl acrylate such as those available from Eastman Chemicals, Inc.; a terpolymer containing ethylene, glycidyl methacrylate, methyl methacrylate such as that available under the trade designation LOTADER™ AX 8900 from Elf Atochem North America; and thermoplastic polyurethanes such as that available under the trade designation MORTHANE™ PN09-200 from Morton Chemicals, Inc.

The blend of polyolefin and hydrocarbon resin can be combined with various adjuvants including fillers, dyes, pigments, nucleating agents, plasticizers, antioxidants, flame retardants, UV stabilizers or absorbers, heat stabilizers, and processing aids such as extrusion aids and lubricants. For example, clays, hydrated silicas, calcium silicates, silicoaluminates, and fine furnace and thermal blacks can be added to increase cohesive strength and stiffness. Platy pigments and fillers, such as mica, graphite, and talc, can be added to increase acid and chemical resistance and reduce gas permeability. Various adjuvants can be added to impart or modify properties such as ink-receptivity, sewability, launderability, and weldability using, e.g., RF, HF, thermal or ultrasonic energy. Pigments, fillers and dyes can also be used to modify optical properties of the blend such as color, opacity and gloss. Other fillers can include glass or polymeric beads or bubbles, metal particles, fibers, and the like. Typically, pigments and fillers will be used in amounts of about 0.1% to about 50% by weight, based on the total weight of the blend. Likewise, adjuvants can be added to any additional layers employed in articles of the invention.

Crosslinkers such as multifunctional acrylates, benzophenone, derivatives of benzophenone, and substituted benzophenones such as acryloyloxybenzophenone can be added to some blends of the invention, and can be used to improve properties of the blend such as solvent resistance, affine deformation characteristics or tensile modulus. Such crosslinkers are preferably not thermally activated, but instead are activated by a source of electromagnetic radiation such as ultraviolet light or electron-beam radiation. If a crosslinker is employed, it typically will be added in an amount of about 0.01% to about 5.0% by weight, based on the total weight of the blend. Crosslinkers can also be added to any additional layers employed in articles of the invention.

Flame retardants can be added to improve resistance to flame initiation or flame propagation. Examples include brominated aromatic compounds such as decabromodiphenyloxide; antimony compounds such as antimony trioxide or antimony pentoxide; aluminum trihydrate; the flame retardants described in WO 99/28128; and the flame retardant polyethylene concentrate commercially available under the trade designation PE concentrate 1 Nat-2P-W from M.A. Hanna Corp., which contains a flame retardant blend of a brominated imide, antimony trioxide and polyethylene polymer. If employed, flame retardants typically will be added in amounts of about 1% to about 50% by weight, based on the total weight of the blend. Flame retardants can also be added to any additional layers employed in articles of the invention.

Antioxidants, ultraviolet absorbers (UVAs) or stabilizers can be used to improve processing or to protect against environmental aging caused by UV light or heat. Suitable antioxidants include hindered phenols and hindered phosphites. Suitable UVAs include benzophenones, benzotriazoles and benzoxazinones. Suitable stabilizers include radical scavengers (e.g., hindered amines and hindered benzoates) and hydroperoxide decomposers (e.g., hindered amines and phosphates). Typically, antioxidants, UVAs and stabilizers are used in amounts of about 0.1% to about 5.0% by weight, based on the total weight of the blend. Antioxidants, UVAs and stabilizers can also be added to any additional layers employed in articles of the invention.

Blending of the polyolefin and hydrocarbon resin and any optional adjuvants can be performed using any method that results in a substantially homogenous distribution of the ingredients. Suitable methods include melt blending, solvent blending, physical mixing and coextrusion. Suitable blending equipment is readily available and will be familiar to those skilled in the art.

Films and fibers of the invention can be made from the blend using a variety of types of equipment and a number of melt-processing techniques (typically, extrusion techniques) well known in the art. Such equipment and techniques are disclosed, for example, in U.S. Pat. No. 3,565,985 (Schrenk et al.), U.S. Pat. No. 5,427,842 (Bland et al.), U.S. Pat. No. 5,589,122 (Leonard et al.), U.S. Pat. No. 5,599,602 (Leonard et al.), and U.S. Pat. No. 5,660,922 (Herridge et al.). For example, single- or multi-manifold dies, spinnerets, full moon feedblocks (such as those described in U.S. Pat. No. 5,389,324 to Lewis et al.), or other types of melt processing equipment can be used, depending on the number of layers desired and the types of materials extruded. Layer multipliers in which a film is split into a plurality of individual subfilms that are then stacked one upon another to increase the number of layers in the ultimate film can also be used.

Tie layers can be used if desired to enhance adhesion between layers in multilayer articles of the invention. Materials useful in the tie layers include, but are not limited to, the various additional layer materials mentioned above.

The articles (e.g., films and fibers) of the invention can be cast or extruded (optionally with the assistance of solvents) onto a suitable collector and used as is. If desired, the articles can be further processed, using, e.g., calendaring, surface treatments, subsequent coating steps, or other processing techniques that will be familiar to those skilled in the art. For some applications, the films or fibers preferably are oriented (e.g., stretched) before use in order to alter the mechanical properties of the resulting film or fiber. Suitable orientation equipment is readily available and will be familiar to those skilled in the art. Uniaxial or biaxial orientation can be performed, using one or more stretching steps and one or more stretching temperatures. For machine stretching, orientation preferably is carried out at a temperature or temperatures between the Tg and Tm of the blend, by stretching the film using suitable lengthwise or cross-direction stretching devices. These devices can be operated sequentially or simultaneously. For blown films, orientation preferably is carried out a temperature or temperatures near or above the Tm of the blend, by blowing a tube of the film to increase the diameter of the tube.

The articles of the invention can optionally be heat-treated at a selected temperature (typically below the melting point of the blend) following the orienting step or steps, in order to provide improved dimensional stability. Any suitable heat treatment and heat treatment method can be used. Preferably the article is restrained during the heat treatment. For example, the article can be passed through a heated chamber after being oriented.

If desired, one or more functional layers can be applied to articles of the invention. For example, an adhesive layer may be applied to at least one of the major surfaces of a film. The adhesive layer can be activated by pressure, heat, electromagnetic energy, solvent or any combination thereof and can have a variety of chemical compositions. Suitable adhesives can be based, for example, on a poly($\alpha$ olefin), block copolymer, acrylate, rubber/resin, or silicone. The adhesive can be applied at conventional coating weights (e.g., 0.0001 to 0.02 $g/cm^2$) using any conventional coating device such as a rotary rod die, slot die or a gravure roll. Other functional layers can also be employed. Thus, for example, an ink-receptive layer, abrasive layer, retroreflective or other light management layer (e.g., a layer of retroreflective elements such as described in copending application Ser. No. 09/783,361 entitled "RETROREFLECTIVE ARTICLE AND METHOD", filed Feb. 14, 2001), light sensitive layer, release layer or other functional layers can be employed. The articles of the invention can be surface-treated (e.g., with a chemical primer coating, flame treatment, corona discharge treatment, or other surface treatment that will be familiar to those skilled in the art), in order to enhance adhesion of a functional layer thereto.

The articles of the invention can be utilized in a variety of applications. For example, films of the invention can be used in sheeting products (e.g., decorative, reflective, or graphic sheeting), piping, decals, flooring materials (e.g., as substitutes for vinyl floor tiles or vinyl roll goods), wall coverings (eg, as substitutes for vinylcoated wallpaper), shelf paper, window films, flexible packaging films, label stock, tape backings, consumer apparel and footwear. Generally such films have a thickness of about 25 $\mu$m to about 500 $\mu$m. Depending on the desired application, thicknesses less than 25 $\mu$m or greater than 500 $\mu$m can also be employed. The reflective sheeting products include those having a non-elastomeric film layer described in the abovementioned copending application Ser. No. 09/783,361, the disclosure of which is incorporated herein by reference.

Fibers of the invention can be used in floor matting (e.g., for entry matting), carpet, woven or nonwoven fabrics and other uses. The fibers can be monolithic or have a multilayer construction (e.g., a core-shell construction). The fibers can be made entirely from a blend of the invention or can contain a layer or layers of other materials (e.g., a ore-shell construction having a blend of the invention in the core or in one or more shell layers, or in both the core and in one or more shell layers). The fibers can have a variety of thicknesses depending on the intended application.

The properties of articles of the invention are further illustrated in the following examples. Unless otherwise indicated, all parts and percentages are by weight.

EXAMPLE 1

Several blends based on mixtures of REXFLEX WL203 polypropylene FPO (Huntsman Corp.) and PICCOLYTE C135 terpene hydrocarbon resin (Hercules Inc.) were compounded using a BRABENDER™ mixing head (C.W. Brabender Instruments, Inc.), at 70%, 60%, 50% or 40% polyolefin content and 30%, 40%, 50% or 60% hydrocarbon resin content. A control composition containing no hydrocarbon resin and the blends were compounded for 3 minutes at 180° C. and a rotor speed of 100 rpm. The compounded control composition and blends were then pressed into films approximately 0.5 to 1 mm thick, using a hydraulic press whose platens had been heated to 180 to 200° C. The pressed films were removed from the heated platens and immediately reinserted between water-cooled platens in a second press and placed under pressure to quench the films. Manual manipulation of the films demonstrated that the films had a vinyl-like feel, and were non-elastomeric, conformable and drapable. Blends containing 30% or 40% hydrocarbon resin were also affinely deformable by hand. Although the films were dead-stretchable by hand at low elongation rates, they were tearable by hand at high elongation rates. These characteristics closely mimicked typical plasticized PVC films.

The dynamic mechanical properties of the films were measured 7 to 10 days later using a RHEOMETRICS™ Solid Analyzer II at 1 Hz and a nominal strain of 0.1%, using a temperature scan that increased from −60° C. to 80° C. at 3° C./min.

Figure 1A:
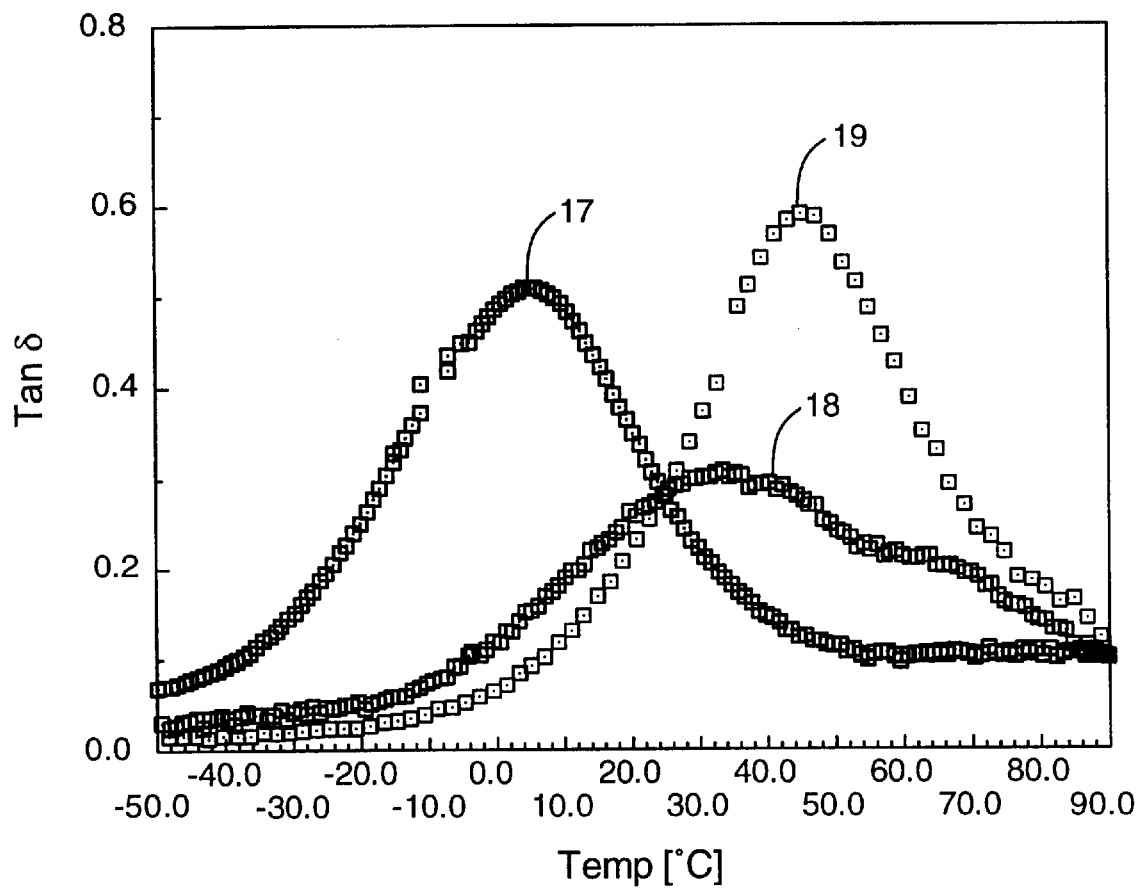
FIG. 1a is a graph illustrating. Tan δ vs. temperature for three plasticized PVC resins.

Curves 12, 13, 14, 15 and 16 in FIG. 1 show the resulting dynamic mechanical analysis (DMA) curves illustrating Tan δ vs. temperature for 100% polypropylene (curve 12) and for blends containing 30%, 40%, 50% and 60% hydrocarbon resin (curves 13, 14, 15 and 16, respectively). As hydrocarbon resin content increased, the glass transition temperature (Tg) increased systematically as evidenced by the shifting position of the Tan δ peak. The single Tg of each blend indicates that the blends were compatible and miscible. Curves 17, 18 and 19 in FIG. 1a illustrate Tan δ vs. temperature DMA results for three representative plasticized PVC resins. These resins have differing Tg values that can readily be mimicked by selecting a suitable blend of polyolefin and hydrocarbon resin. This facilitates matching or mimicking the temperature-dependent behavior of PVC films.

Figure 2:
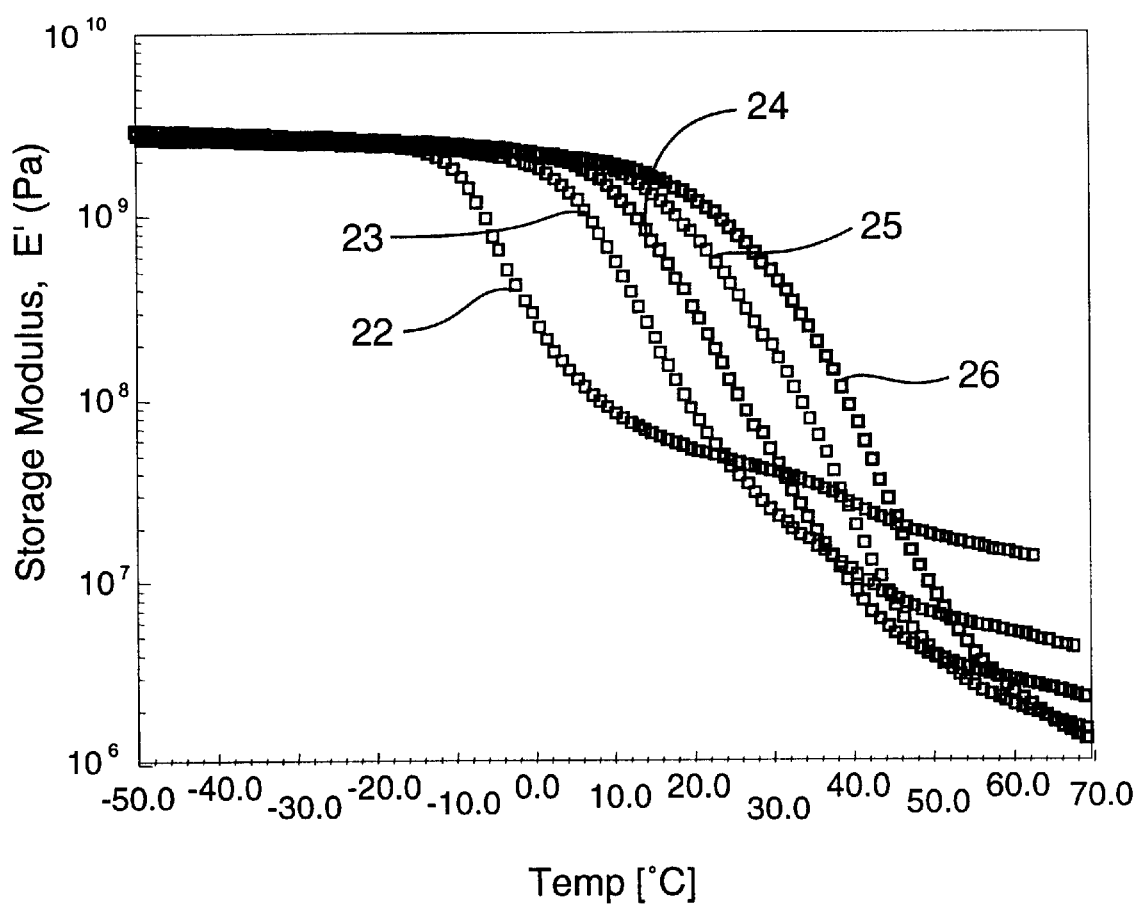
FIG. 2 is a graph illustrating storage modulus vs. temperature for several blends of polyolefin and hydrocarbon resin.
Figure 2A:
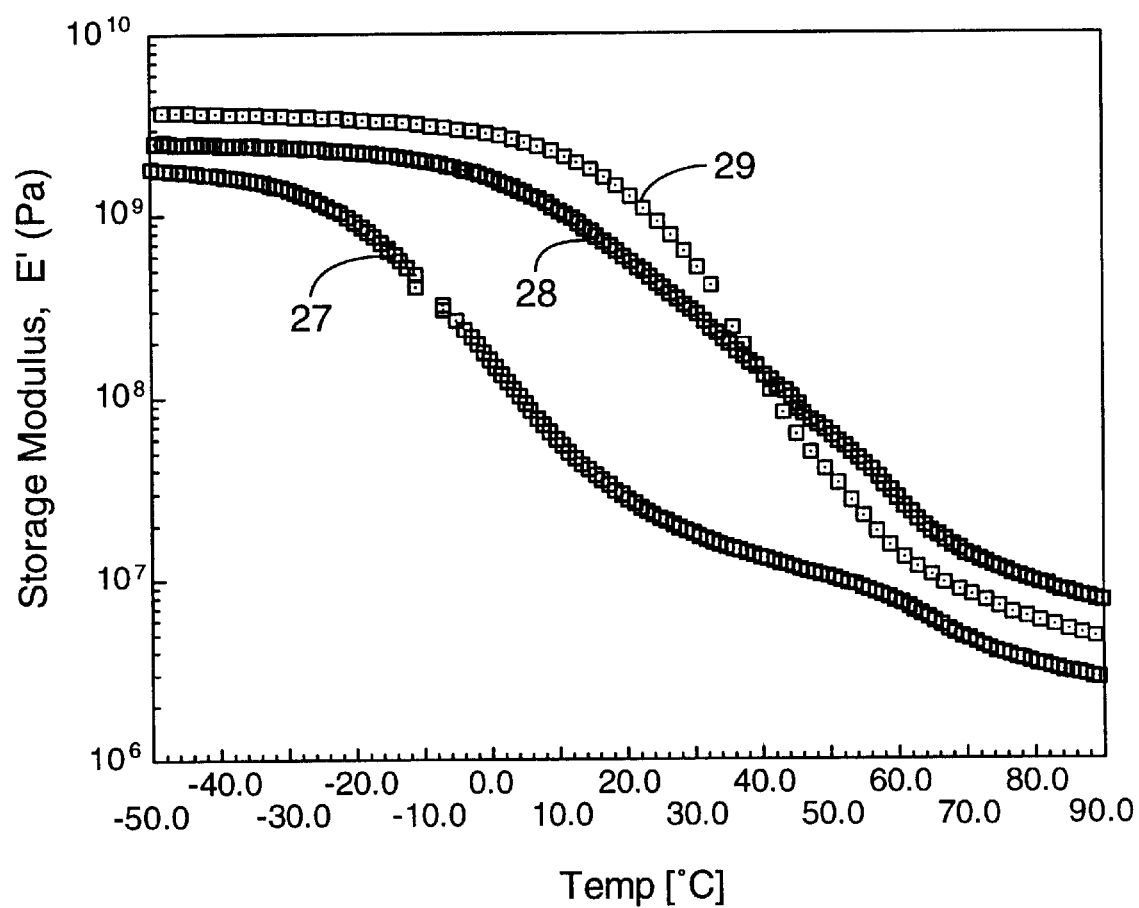
FIG. 2a is a graph illustrating storage modulus vs. temperature for three plasticized PVC resins.

Curves 22, 23, 24, 25 and 26 in FIG. 2 show the storage moduli for 100% polypropylene (curve 22) and for blends containing 30%, 40%, 50% and 60% hydrocarbon resin (curves 23, 24, 25 and 26, respectively). Curves 27, 28 and 29 in FIG. 2a illustrate storage moduli.for three representative plasticized PVC resins. As shown in FIG. 2, increasing the proportion of hydrocarbon resin caused the room temperature storage modulus of the blend to increase as well. This facilitates matching or mimicking the storage modulus behavior and "hand" of PVC films. Increasing the proportion of hydrocarbon resin also caused the elevated temperature storage modulus of the blend to decrease (e.g., at 60° C. to 70° C.). As discussed above, this latter effect can aid in the application of films made from these blends to irregular surfaces, because heat can be used to coax (soften) the film into conformability with such a surface. The blend containing 60% hydrocarbon resin actually had better conformability at elevated temperatures than the comparison PVC films shown in curves FIG. 2a.

EXAMPLE 2

Several 3 layer films were fabricated using a 254 mm wide 3 layer CLOEREN™ coextrusion vane die, a water cooled casting roll and downstream wind up facilities. Blends containing 60%, 50% or 40% of REXFLEX WL203 FPO polyolefin and 40%, 50% or 60% of PICCOLYTE C135 terpene hydrocarbon resin were compounded in a 34 mm BERSTORFF™ co-rotating twin screw extruder and fed to the center layer of the die. The two surface layers of the die were fed with ELVAX™ 3134 (DuPont Co.) poly (ethylene-co-vinyl acetate) having 12.0% vinyl acetate content and an 8.0 melt flow index, delivered from two independent single screw extruders. Flow rates from the three extruders were adjusted such that the surface layers were each 15% of the overall film and the center layer was 70% of the overall film. The casting roll was cooled to 23° C. Both 0.08 mm thick and 0.8 mm thick films were cast from each blend. The thicker films were used to prepare biaxially stretched films at a temperature of 75° C. and a stretch rate of 100%/sec. All stretching was done in a simultaneous fashion to prepare films having 2×2, 3×3, 4×4, and 6×6 balanced draw ratios.

Manual manipulation of the films demonstrated that the films had a vinyl-like feel, and were non-elastomeric, conformable, drapable, and affinely deformable by hand. Although the films were dead-stretchable by hand at low elongation rates, they were tearable by hand at high elongation rates. The films had substantially isotropic behavior, that is, their physical properties were essentially the same in each of two orthogonal directions in the plane of the film (in this case, in the two directions of orientation).

Mechanical testing of the thin cast films (0.08 mm) and the biaxially stretched films was performed 7 to 10 days later using a tensile to break test, a stress relaxation test, and a strain recovery test.

Tensile modulus and deformation index were obtained using a tensile to break test, which was performed as follows. Film samples having a width of 12.7 mm were placed in a tensile tester at a gauge length of 50.8 mm. The tensile tester was operated at a crosshead speed of 25.4 mm/min (50%/min) to 1% strain, and then operated at 305 mm/min. (600%/min) until the sample failed. Tensile modulus was recorded as the secant modulus between 0.5% and 1% strain. Deformation index was recorded as the ratio of yield stress to draw stress.

Residual stress and strain recovery were obtained using a stress relaxation test, which was performed as follows. Film samples having a width of 12.7 mm were placed in a tensile tester at a gauge length of 50.8 mm. Two fiducial marks were placed 50.8 mm apart on the sample. The tensile tester was operated at a crosshead speed of 305 mm/min (600%/min) to 100% strain, so that the fiducial marks were 101.6 mm apart. The sample was held at 100% strain for 60 seconds and the residual stress recorded. The sample was removed from the tensile tester and allowed to recover unrestrained on a bench top for 24 hours at room temperature. The new length between the fiducial marks was recorded and the strain recovery calculated as a percentage of the original strain lost as the sample recovered on the bench top.

Figure 3:
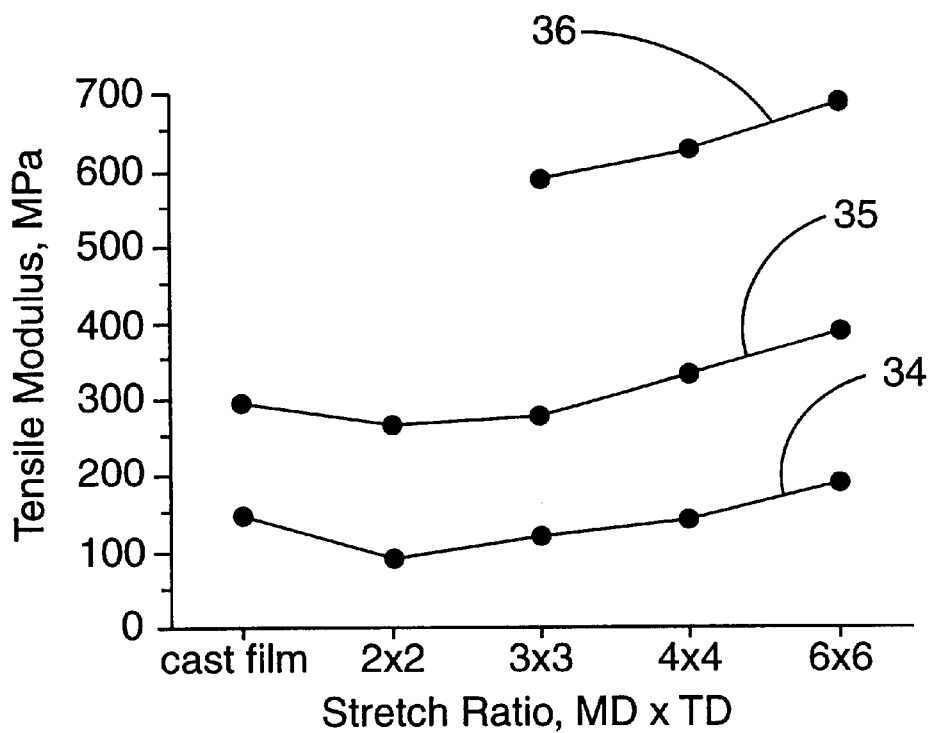
FIG. 3 is a graph illustrating the tensile modulus of several blends of polyolefin and hydrocarbon resin, as cast films or at various biaxial orientation ratios.

Data for the cast films and biaxially stretched films can be seen in FIGS. 3, 4, 5 and 6. FIG. 3 shows the tensile modulus vs. stretch ratio for blends containing 40%, 50% or 60% hydrocarbon resin (curves 34, 35 and 36, respectively). The addition of the hydrocarbon resin to the polyolefin increased the tensile modulus of the blend. Above a sufficiently high orientation ratio (e.g., above a minimum or inflection point that tended to occur at around a 2×2 or 3×3 orientation), increased orientation also increased the tensile modulus of the oriented blend. However, tensile modulus was more heavily influenced by hydrocarbon resin content than by stretch ratio. Tensile modulus values of about 620 to about 700 MPa were obtained from blends containing 60% hydrocarbon resin stretched 4×4 or 6×6. At 60% hydrocarbon resin content, films biaxially stretched at lower stretch ratios tended to be brittle with failures occurring prior to yield. As the biaxial stretch ratio was increased to 3×3 and beyond these films became more ductile and elongations beyond the yield point were realized. Thus although films containing 60% hydrocarbon resin that were cast or biaxially stretched up to 2×2 were brittle, similar films biaxially stretched to 3×3, 4×4, and 6×6 demonstrated elongations at break of 283%, 211% and 163%, respectively.

FIG. 4a shows stress-strain curves 40, 41 and 42 for film samples that were cast (curve 40), or stretched 2×2 (curve 41) or 3×3 (curve 42), respectively, prepared from the blend containing 50% hydrocarbon resin. Curve 40 exhibits non-affine deformation. Curves 41 and 42 in FIG. 4a show progressively greater degrees of affine deformation. As mentioned above, point 43 is the observed yield point for curve 40. Point 46 is the inflection point and deemed yield point for curve 42. The vertical height of point 43 in FIG. 4a shows the yield stress for curve 40, and the vertical height of point 44 shows the draw stress for curve 40. The horizontal extent of point 43 in FIG. 4a shows the yield strain for curve 40, and the horizontal extent of point 45 shows the draw strain for curve 40.

Figure 4:
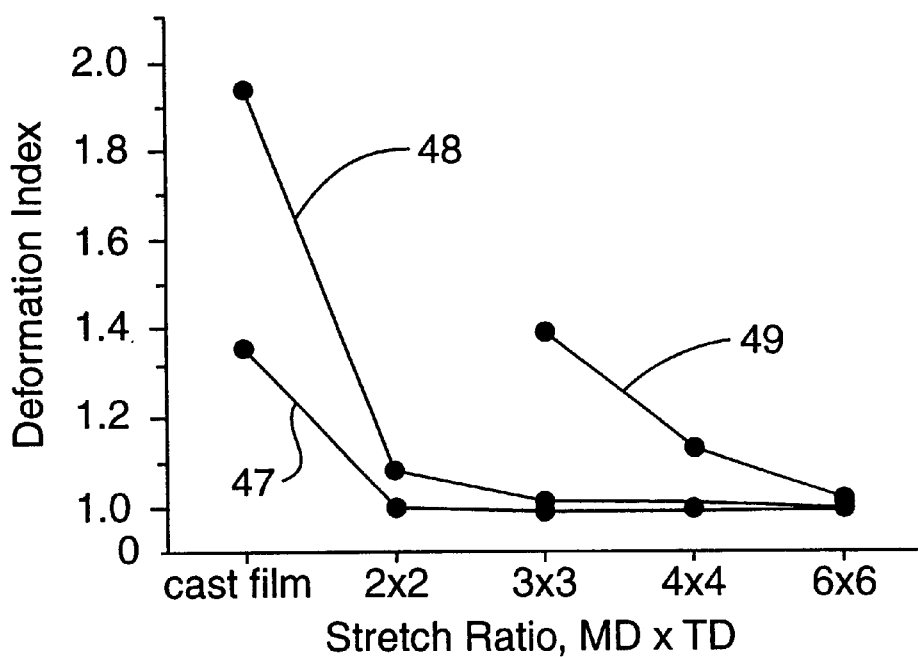
FIG. 4 is a graph illustrating the deformation index of several blends of polyolefin and hydrocarbon resin, as cast films or at various biaxial orientation ratios.
Figure 4A:
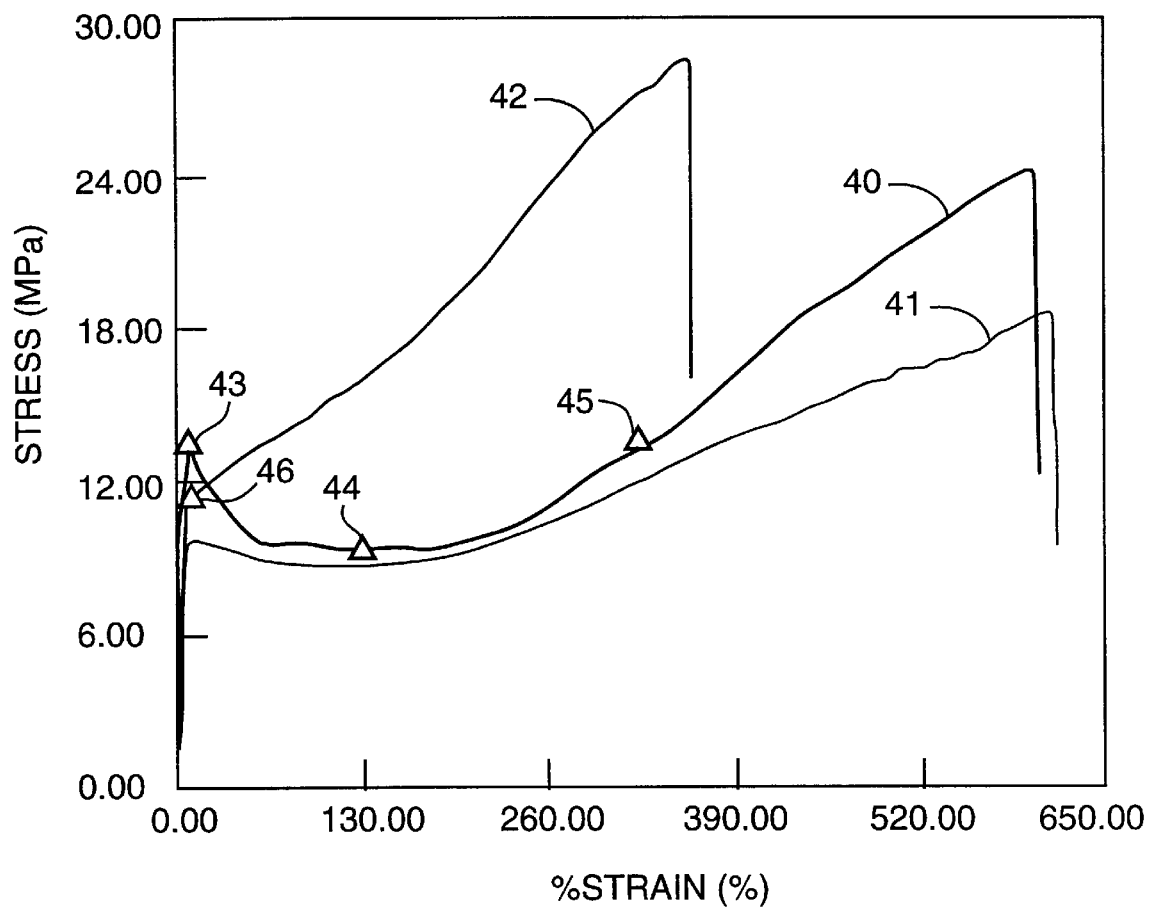
FIG. 4a is a graph illustrating stress-strain curves for films containing a 50:50 blend of polyolefin and hydrocarbon resin, as a cast film and at two biaxial orientation ratios.
Figure 5:
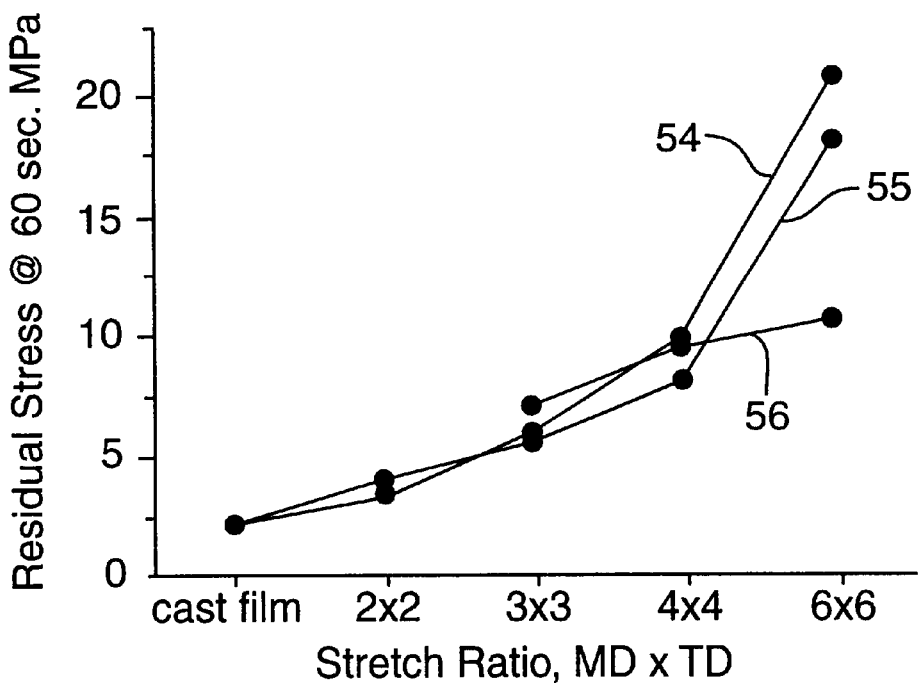
FIG. 5 is a graph illustrating residual stress for several blends of polyolefin and hydrocarbon resin, as cast films or at various biaxial orientation ratios.
Figure 6:
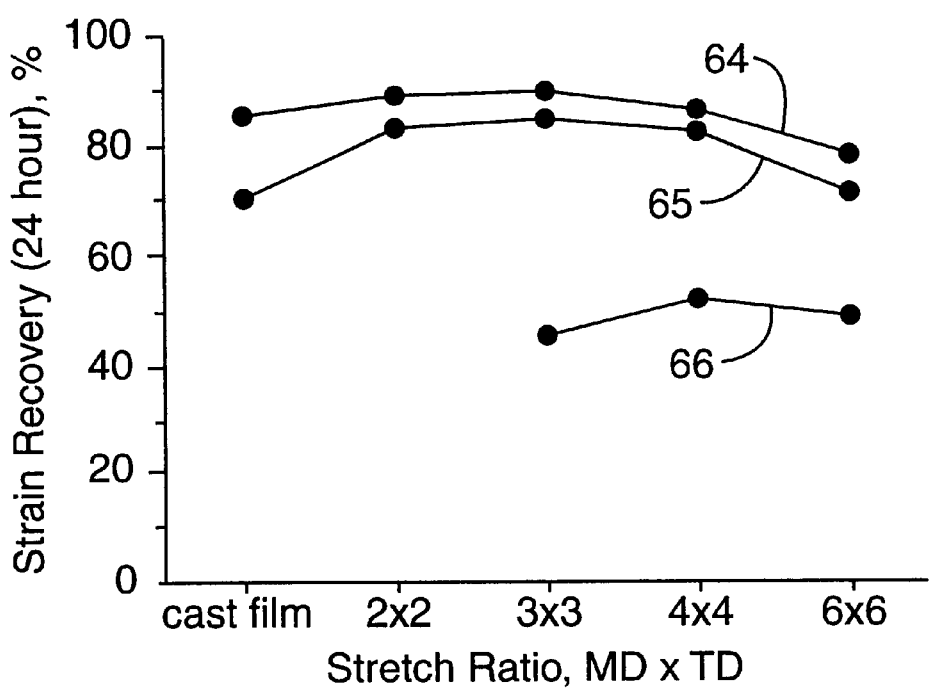
FIG. 6 is a graph illustrating strain recovery for several blends of polyolefin and hydrocarbon resin, as cast films or at various biaxial orientation ratios.

FIG. 4 shows the deformation index vs. stretch ratio for blends containing 40%, 50% or 60% hydrocarbon resin (curves 47, 48 and 49, respectively). The addition of the hydrocarbon resin to the polyolefin tended to cause non-affine deformation in the cast films. But as the biaxial stretch ratio was increased, the deformation index decreased and approached 1.0 (completely affine deformation) at suitably high stretch ratios. Thus the deformation index could be controlled at 1.0 even at the highest hydrocarbon resin contents. These highest hydrocarbon resin content materials are important because they also demonstrated the most dead stretch (conformable) characteristics as is shown in FIG. 5 and FIG. 6. For example, for 60% hydrocarbon resin materials stretched to 6×6, the residual stress was 10.7 MPa and the 24 hour strain recovery was 49% (see curve 56 in FIG. 5 and curve 66 in FIG. 6).

EXAMPLE 3

Figure 7:
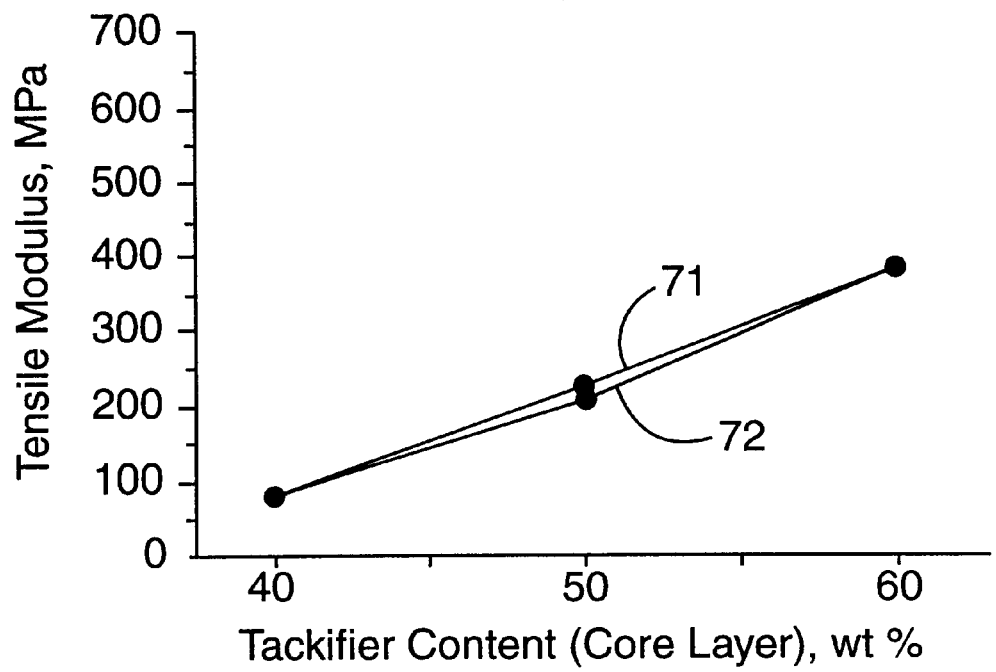
FIG. 7 is a graph illustrating the tensile modulus of several blown films made from blends of polyolefin and hydrocarbon resin, measured in the machine and transverse directions.
Figure 8:
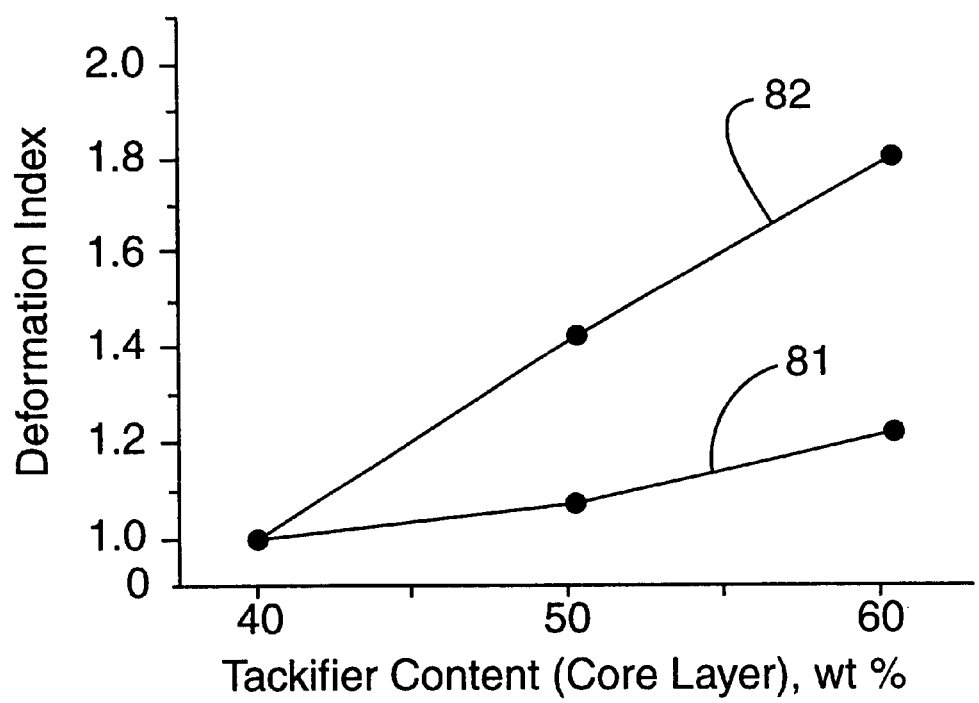
FIG. 8 is a graph illustrating the deformation index of several blown films made from blends of polyolefin and hydrocarbon resin, measured in the machine and transverse directions.
Figure 9:
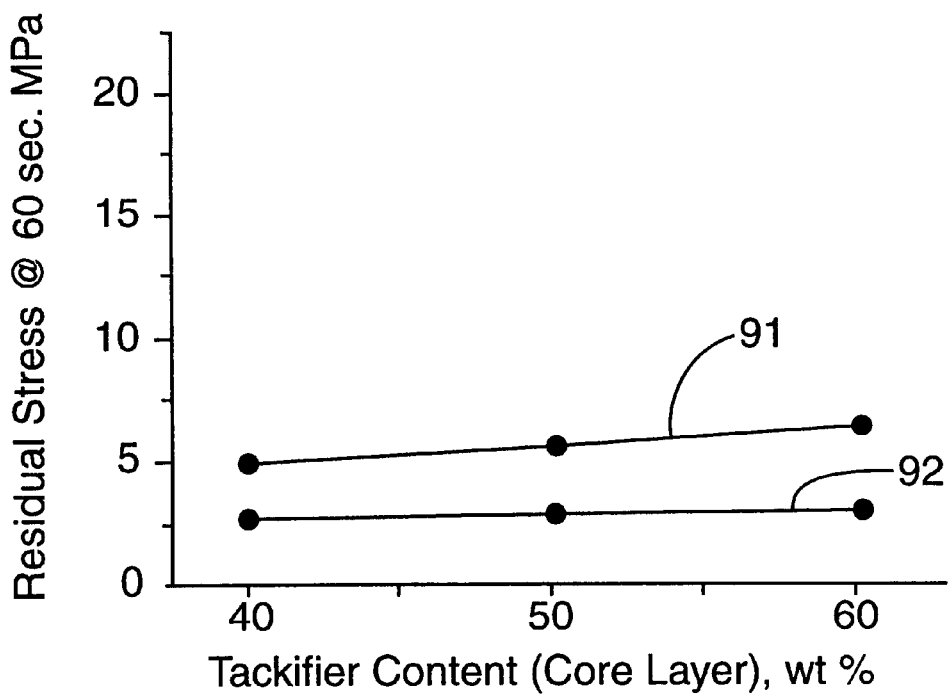
FIG. 9 is a graph illustrating residual stress for several blown films made from blends of polyolefin and hydrocarbon resin, measured in the machine and transverse directions.
Figure 10:
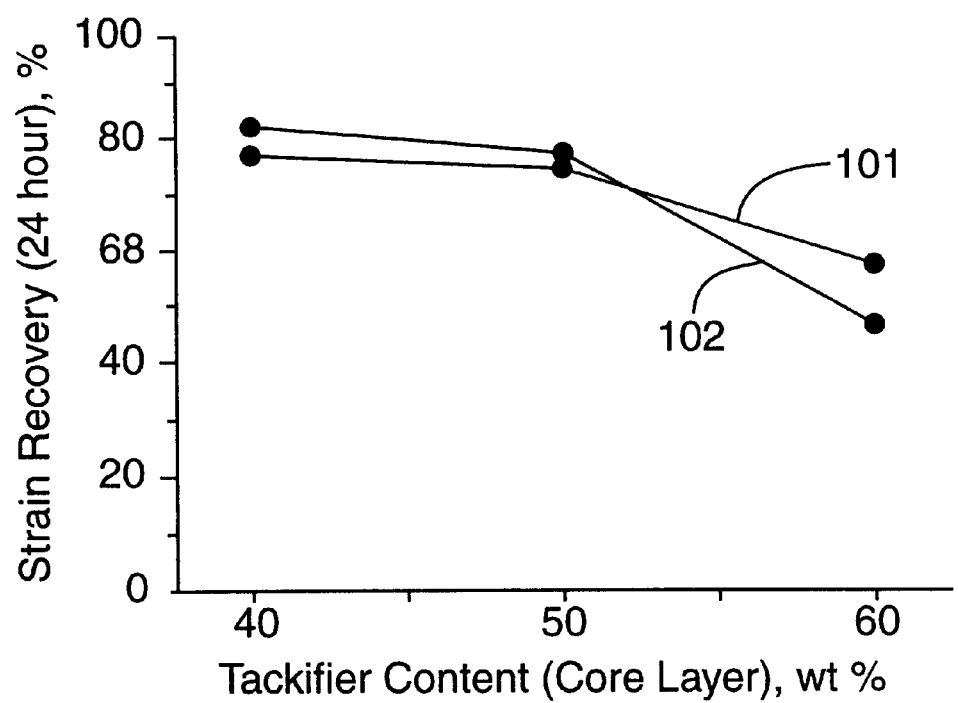
FIG. 10 is a graph illustrating strain recovery for several blown films made from blends of polyolefin and hydrocarbon resin, measured in the machine and transverse directions.

Several 3 layer blown films were fabricated using a three layer annular die with a nominal diameter of about 62 mm. Blends containing 60%, 50% or 40% of REXFLEX WL203 FPO polyolefin and 40%, 50% or 60% of PICCOLYTE C135 terpene hydrocarbon resin were compounded in a BRABENDER conical twin screw extruder and fed to the center layer of the die. The two surface layers of the die were fed with ELVAX™ 3135 (DuPont Co.) poly(ethylene-co-vinyl acetate) having 12.0% vinyl acetate content and a 0.35 melt flow index, delivered from two independent single screw extruders. As in Example 2, flow rates from the three extruders were adjusted such that the surface layers were each 15% of the overall film and the center layer was 70% of the overall film. The take up speed and bubble air pressure were adjusted to give a nominal MD×TD stretch ratio of 8×2 and a final film thickness of approximately 0.1 mm. The mechanical properties of the blown film were evaluated in the machine and transverse directions using the methods described in Example 2. Data for these blown films can be seen in FIGS. 7, 8, 9 and 10. FIG. 7 shows tensile modulus vs. hydrocarbon resin content in the machine direction and transverse direction (curves 71 and 72, respectively). FIG. 8 shows deformation index vs. hydrocarbon resin content in the machine direction and transverse direction (curves 81 and 82, respectively). FIG. 9 shows residual stress vs. hydrocarbon resin content in the machine direction and transverse direction (curves 91 and 92, respectively). FIG. 10 shows strain recovery vs. hydrocarbon resin content in the machine direction and transverse direction (curves 101 and 102, respectively). As was also shown in FIG. 3, FIG. 7 illustrates that tensile modulus was influenced more by hydrocarbon resin content than by stretch ratio. Even though the unbalanced stretch ratio from the blown film process was 8 MD×2 TD, the tensile modulus of the blown films appeared to be the same in both test directions. The orientation delivered via the blowing process may not have been as high as that delivered via the tentering process used in Example 2, since the observed deformation indices were generally higher for the blown films (compare curve 46 in FIG. 4 and curves 81 and 82 in FIG. 8). However, the benefits of increasing orientation in order to lower the deformation index can still be seen in FIG. 8. In FIG. 8, the MD deformation index (curve 81) was lower than the transverse direction deformation index (curve 82). This appears to have been caused by the higher stretch ratio in the machine direction. As was the case for the tentered films of Example 2, the blown films of this Example 3 also exhibited improved dead stretch characteristics (low residual stress and low strain recovery) at higher hydrocarbon resin concentrations (compare FIGS. 5, 6, 9 and 10).

The results in Examples 1 through 3 show that blends containing higher hydrocarbon resin concentrations had increased tensile modulus at room temperature, and decreased tensile modulus at elevated temperatures. This facilitates application of thin films (e.g., graphic films) on large substrates, and helps the applicator conform the film to irregularities in the substrate via the use of moderate heat. The results in Examples 2 and 3 also show that higher hydrocarbon resin concentrations decreased both residual stress and strain recovery. These properties enable fabrication of films having "dead stretch" characteristics that are very similar to and in some cases better than plasticized PVC. Such "dead stretch" characteristics allow graphic films to be tightly applied using coated adhesives to irregular (contoured) surfaces, and enable the applied film to hold the shape of the underlying irregular surface for the lifetime of the graphic. Sufficient orientation either via a tentering process or a blown film process also has the beneficial effect of lowering the deformation index and providing more affine deformation. Affine (uniform) deformation helps preserve the appearance of printed graphics despite application of the graphic to an irregular surface.

EXAMPLE 4

Using the method of Example 2, three 3 layer films were prepared. The center layer of the die was fed with a blend of 60% REXFLEX WL203 FPO polyolefin and 40% PICCOLYTE C135 terpene hydrocarbon resin that had been compounded in a LEISTRITZ™ 34-mm co-rotating twin screw extruder. One of the outer layers of the die was fed with SURLYN™ 1705-1 zinc ionomer of ethylene methacrylic acid copolymer delivered from a single screw extruder. This layer formed a high gloss, solvent resistant and abrasion resistant layer in the final film construction. The other outer layer of the die was fed with BYNEL™ 3101 acrylate-modified ethylene vinyl acetate copolymer having a 18% vinyl acetate content delivered from a second single screw extruder. This layer formed a receptor layer to which would be applied a layer of acrylate-based retroreflective cube corner elements. Flow rates from the three extruders were adjusted such that the high gloss layer was 10%, the core layer was 70% and the receptor layer was 20% of the resulting film. The other two films were prepared in a similar fashion, using BYNEL 3860 anhydride-modified ethylene vinyl acetate copolymer or MORTHANE PNO9-200 thermoplastic polyurethane in the receptor layer in place of BYNEL 3101 copolymer. The receptor layers of all three films were corona-treated to facilitate adhesion of the cube-corner retroreflective elements.

Figure 11:
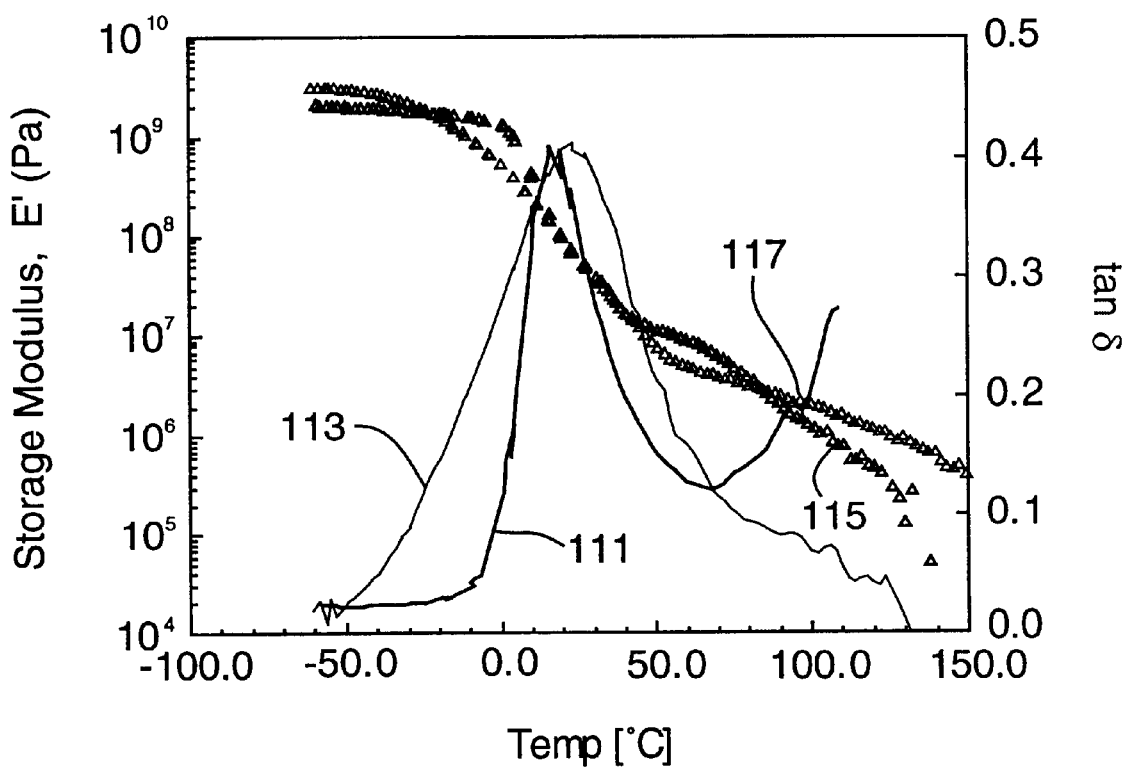
FIG. 11 is a graph illustrating Tan δ vs. temperature and storage modulus vs. temperature for a blend of polyolefin and hydrocarbon resin and for plasticized PVC.

FIG. 11 shows dynamic mechanical analysis curves illustrating Tan δ vs. temperature for the multilayer films of the invention and for plasticized PVC. All three multilayer films had similar dynamic analysis curves, shown as curve 111 in FIG. 11. Plasticized PVC is shown as curve 113 in FIG. 11. FIG. 11 also shows storage modulus vs. temperature curves for the multilayer film and for plasticized PVC (curves 115 and 117, respectively). The multilayer film closely matched the mechanical properties of the plasticized PVC film.

EXAMPLE 5

Using the method of Example 4, several 3 layer films were prepared using a core layer containing a blend of 80% REXFLEX WL203 FPO polyolefin and 20% PICCOLYTE C135 terpene hydrocarbon resin, and a gloss layer made from SURLYN 1705-1 ethylene/(meth)acrylic acid copolymer. In all instances the extruders were adjusted so that the receptor layer represented 10% of the film. The extruders were adjusted so that in most instances the core represented 70% of the film. However, for Film 5-2, the extruders were adjusted so that the core represented 50% of the film. Set out below in Table I are the film number and the amounts and types of materials employed in the receptor layer for each film.

TABLE I

| Film No. | Receptor Layer |
| --- | --- |
| 5-1 | 20% BYNEL 3101 acrylate-modified ethylene vinyl acetate |
| 5-2 | 40% BYNEL 3101 acrylate-modified ethylene vinyl acetate |
| 5-3 | 20% BYNEL 2014 acid-modified ethylene acrylate |
| 5-4 | 20% BYNEL 2002 acid-modified ethylene acrylate |
| 5-5 | 20% ELVAX 3165 ethylene vinyl acetate |
| 5-6 | 20% BYNEL 22E695 amine-modified acid copolymer |
| 5-7 | 20% NUCREL 0403 ethylene/methacrylic acid copolymer |

The films felt like plasticized PVC.

EXAMPLE 6

Using the method of Example 5, films were prepared using a core made from 90% or 80% REXFLEX WL 203 FPO polyolefin, blended with 10% or 20% REGALITE™ V3120 partially hydrogenated hydrocarbon resin. The films each contained 10% of a gloss layer made from SURLYN 1705-1 ethylene/(meth)acrylic acid copolymer. Set out below in Table II are the film number and the amounts and types of materials employed in the receptor layer and core layer for each film.

TABLE II

| Film No. | Receptor Layer | Core Layer |
| --- | --- | --- |
| 6-1 | 30% BYNEL 3101 modified EVA | 60% 20/80 REGALITE V3120/REXFLEX WL 203 |
| 6-2 | 20% BYNEL 3101 modified EVA | 60% 20/80 REGALITE V3120/REXFLEX WL 203 |
| 6-3 | 20% BYNEL 2014 acid-modified ethylene acrylate | 60% 20/80 REGALITE V3120/REXFLEX WL 203 |

The films felt like plasticized PVC.

EXAMPLE 7

Using the method of Example 4, a 3 layer film containing a fluorescent dye in the core layer was prepared. The dye was protected from degradation and discouraged from migration by the outer layers of the film. HOSTASOLT™ Yellow 3G fluorescent dye (Clariant Corp.) was added to the core material blend at the extruder. The resulting film felt like plasticized PVC.

EXAMPLE 8

Using the method of Example 1, film samples containing a 60:40 ratio of polyolefin and hydrocarbon resin were combined with 34.65% titanium dioxide and 0.42% of IRGANOX™ 1010 antioxidant (commercially available from Ciba Specialty Chemicals, Inc.), 0.84% IRGAFOS™ 12 antioxidant (commercially available from Ciba Specialty Chemicals, Inc.), 0.25% TINUVIN™ 328 UV absorber (commercially available from Ciba Specialty Chemicals, Inc.) and 0.25% TINUVIN™ 770 hindered amine light stabilizer (commercially available from Ciba Specialty Chemicals, Inc.). Films were prepared using three different hydrocarbon resins (PICCOLYTE C135, REGALREZ 1139, or REGALITE T1140) from three different lots of each hydrocarbon resin. Weathering was evaluated using an ATLAS™ C165A Xenon Arc weatherometer and ASTM Test Method G26, Method A. Tensile data was collected on all 9 film samples after 500 hours. The strain at break and segment modulus values (measured between 1.5 and 2% strain) showed the following changes, indicating the extent to which embrittlement of the film samples occurred due to weathering. For film samples that contained PICCOLYTE C135 hydrocarbon resin the average changes in strain at break and segment modulus were −78% and +34%, respectively. For film samples containing REGALREZ 1139 resin, the average changes were −75% and +18%. For film samples containing REGALITE T1140 resin, the average changes were −12% and +12%.

EXAMPLE 9

Using the method of Example 8, additional film samples containing REGALREZ 1139 or REGALITE T1140 hydrocarbon resin were prepared using 34.32% $TiO_2$, and double the amounts of the antioxidants, UV absorber and HALS used in Example 8. The film samples were evaluated in the weatherometer for 1000 hours. The strain at break and segment modulus values showed the following changes, indicating the extent to which embrittlement of the film samples occurred due to weathering. For film samples containing REGALREZ 1139 resin, the average changes were −73% and +28%. For film samples containing REGALITE T1140 resin, the average changes were −6% and +7%.

EXAMPLE 10

Using the method of Example 9, additional film samples containing PICCOLYTE C135, REGALREZ 1139 or REGALITE T1140 hydrocarbon resin were prepared using 34.32% $TiO_2$, 0.25 each of the antioxidants IRGANOX 1010 and IRGAFOS 168, 0.5% of the UV absorber TINUVIN 328, and 0.25 Wt.% each of the HALS TINUVIN 770 and CHIMASORB™ 2020 (commercially available from Ciba Specialty Chemicals, Inc.). The film samples were evaluated in the weatherometer for 500 hours. The strain at break and segment modulus values showed the following changes, indicating the extent to which embrittlement of the film samples occurred due to weathering. For film samples containing PICCOLYTE C135 resin, the average changes were +25% and +4%. For film samples containing REGALREZ 1139 resin, the average changes were −2% and +1%.

For film samples containing REGALITE T1140 resin, the average changes were −42% and −15%.

EXAMPLE 11

Using the method of Example 9, additional film samples containing no hydrocarbon resin, or REGALREZ 1139 or REGALITE T1140 hydrocarbon resin, were prepared using varying amounts of titanium dioxide, the antioxidants IRGANOX 1010 and IRGAFOS 12, the UV absorber TINUVIN 328, and the HALS TINUVIN 770. The run number and amount of each ingredient are set out below in Table III.

TABLE III

| Run No. | Polyolefin | Hydrocarbon Resin | TiO$_2$ | Antioxidant | Antioxidant | UV Absorber | HALS |
|---|---|---|---|---|---|---|---|
| 11-1 | 100% | — | — | — | — | — | — |
| 11-2 | 65% | — | 35% | — | — | — | — |
| 11-3 | 99% | — | — | 0.42%$^3$ | 0.08%$^4$ | 0.25%$^5$ | 0.25%$^6$ |
| 11-4 | 64.35% | — | 34.65% | 0.42%$^3$ | 0.08%$^4$ | 0.25%$^5$ | 0.25%$^6$ |
| 11-5 | 63.85% | — | 34.15% | 0.84%$^3$ | 0.17%$^4$ | 0.50%$^5$ | 0.50%$^6$ |
| 11-6 | 38.28% | 25.4%$^1$ | 34.32% | 0.84%$^3$ | 0.17%$^4$ | 0.50%$^5$ | 0.50%$^6$ |
| 11-7 | 38.28% | 25.4%$^2$ | 34.32% | 0.84%$^3$ | 0.17%$^4$ | 0.50%$^5$ | 0.50%$^6$ |

$^1$REGALREZ 1139
$^2$REGALREZ 1140
$^3$IRGANOX 1010
$^4$IRGAFOS 12
$^5$TINUVIN 328
$^6$TINUVIN 770

Figure 12:
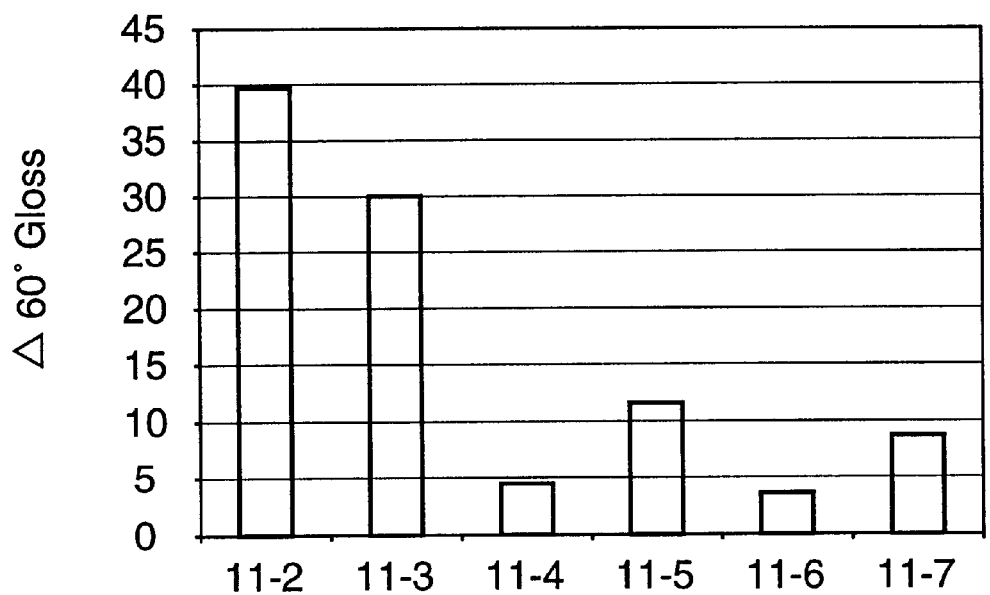
FIG. 12 is a graph illustrating change in 60° gloss after weathering for blends of polyolefin and hydrocarbon resin containing stabilizers.
Figure 13:
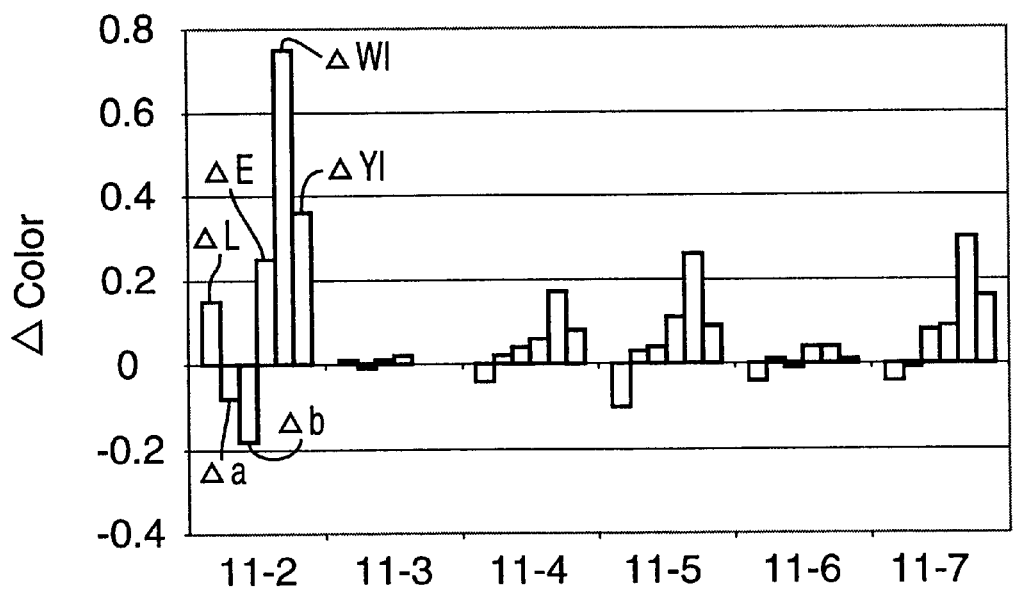
FIG. 13 is a graph illustrating color change after weathering for blends of polyolefin and hydrocarbon resin containing stabilizers.

The film samples of Run Nos. 11-2 through 11-7 were evaluated in the weatherometer for 1000 hours, then evaluated for 60° gloss difference using ASTM D523-89 and a MICRO-TRI-GLOSS™ Model 4520 gloss meter (BYK Gardner Co.), for color difference using ASTM D2244-93, and for yellowness and whiteness index difference using ASTM E313-98. FIG. 12 shows the 60° gloss results, and indicates that Run No. 11-6 provided very good gloss retention. FIG. 13 shows the color test results. The first data bar for each sample in FIG. 13 shows ΔL, which is a measure of whiteness/blackness shift. The second data bar shows Δa, which is a measure of green/red shift. The third data bar shows Δb, which is a measure of blue/yellow shift. The fourth data bar shows ΔE, which is a calculated from ΔL, Δa and Δb. The fifth data bar shows ΔWI, which is a measure of whiteness index shift, and the sixth data bar ΔYI, which is a measure of the yellowness index shift. Run No. 11-3 was not evaluated for ΔWI or ΔYI. As shown in FIG. 13, Run No. 11-6 provided particularly good color stability.

EXAMPLE 12

Using the method of Examples 2 and 4, a 3-layer film was fabricated and biaxially oriented at a 6×6 ratio by simultaneous stretching. The core layer of the film contained a blend of 40% REXFLEX WL203 FPO polyolefin and 60% PICCOLYTE C135 terpene hydrocarbon resin. The skin layers of the film (which each represented 15% of the overall film construction) contained ELVAX™ 3134 poly(ethylene-co-vinyl acetate). The resulting clear graphic film was laminated to an acrylic pressure sensitive adhesive that had been precoated on a release liner.

An unimaged sample of the film was tested for conformability by applying a 25.4 mm wide strip of the film to an acrylic painted metal panel having three depressed channels in its surface. The channels were sized so that when the film was bridged across the channels and then stretched down into the channels, the applied film would be elongated by 10%, 15%, and 25% respectively. The unimaged film was stretched into these channels at room temperature using finger pressure. It deformed easily into the channels without breaking. The applied film was examined after four days and showed no signs of lifting out of the channels.

An electrostatically printed image was transferred from a transfer paper to a sample of the clear graphic film using a hot roll laminator. A 25.4 mm wide strip of the imaged film was applied to the channeled panel at room temperature using finger pressure. The imaged film deformed easily into the channels without breaking and without severe distortion of the image. The imaged film application was repeated by heating the film and panel for one minute at 66° C. after the film had been bridged over the channels. The heated film deformed easily into the channels without breaking and without severe distortion of the image. The applied film was examined after four days and showed no signs of lifting out of the channels.

A sample of the imaged film was also applied to a plastic panel that had a 15-mm deep rounded contour molded into the face of the panel. The film was applied to the panel by bridging the film over the contour, and then stretching the film down into the contour using finger pressure and a heat gun. The imaged film deformed easily and stretched down into the contour without breaking and without severe distortion of the image. The applied film was examined after four days and showed no signs of lifting out of the contour.

EXAMPLE 13

Using the method of Example 4, a series of three different 4-layer films was prepared by co-extrusion. The core layer of each film was formed by dissolving 0.25% each of CYTEC™ UV531 and CYTEC™ UV 3346 ultraviolet stabilizers in a hydrocarbon resin, melting the resulting mixture and metering separate streams of the molten mixture and a polyolefin to a 34-mm LEISTRITZ™ co-rotating twin screw extruder equipped with a pelletizer. The pellets were fed to a second twin screw extruder and into the second layer of a 4-layer die. A single screw extruder was used to deliver two split streams containing BYNEL™ 3101 copolymer and 0.25% each of CYTEC UV531 and CYTEC UV3346 ultraviolet stabilizers to the first and third layers of the die. The first layer formed a receptor layer in the finished film, and the third layer formed a tie layer between the core layer and a gloss layer. The gloss layer was formed by delivering SURLYN™ 1705-1 copolymer and 0.25% each of CYTEC UV531 and CYTEC UV 3336 ultraviolet absorbers from a further single screw extruder. The flow rates were adjusted so that the receptor, core, tie and gloss layers represented 20%, 60%, 10% and 10%, respectively, of the total film construction. In addition to the ultraviolet stabilizers mentioned above, the three different 4-layer films contained the core materials shown below in Table IV:

TABLE IV

| Film No. | Core Layer Ingredients |
|---|---|
| 13-1 | 55% EXACT ™ 3024 polyolefin[1] |
|  | 15% EXACT ™ 4033 polyolefin[1] |
|  | 30% REGALITE ™ V3120 resin[2] |
| 13-2 | 80% ADFLEX ™ KS 359P polyolefin[3] |
|  | 20% REGALITE ™ V3120 resin[2] |
| 13-2 | 50% EXACT ™ 3035 polyolefin[1] |
|  | 20% EASTMAN ™ SP 1305 polyolefin[4] |
|  | 30% REGALITE ™ V3120 resin[2] |
|  | 0.1 wt % HOSTASOL 3G fluorescent dye[5] |

[1]Exxon Chemicals, Inc.
[2]Hercules, Inc.
[3]Basell Polyolefins
[4]Eastman Chemicals Inc.
[5]Clariant Corporation; dissolved in the resin and then metered into the twin screw extruder.

Two films having overall calipers of 0.25 mm and 0.18 mm were prepared from Film No. 13-2 by varying the line speed. The proportional layer thicknesses remained the same for these two films. The receptor layer surfaces of all of the films were corona-treated prior to casting an acrylate syrup on the corona-treated surfaces to form a layer of cube-corner retroreflective elements.

EXAMPLE 14

Using the method of Example 3, several 3-layer blown films having clear, white or black core layers were fabricated using blown film processing techniques. These 3-layer films can be used as replacements for plasticized PVC films on vehicles, e.g., as graphic films or other decorative decals on automobiles, trucks and motorcycles, and blackout films or other decorative trim applied around the doors and windows of automobiles and trucks. Film conformability is important for ensuring long-term intimate adhesion of the film to the irregular or compound curved surfaces typically found on vehicles. Without sufficient conformability, the stresses set up in the films during application can cause the film to pull away from the vehicle surface and undergo undesirable effects such as edge lifting. In addition, the film preferably should have an appropriate tensile modulus so that the film is sufficiently self-supporting to facilitate handling during film application.

The clear films and the white film had a finished thickness of 0.06 mm, and the black film had a finished thickness of 0.10 mm. In each case the core layer was 70% of the overall film construction and the two surface layers were each 15% of the overall film construction. The core layer provided conformability and mechanical properties mimicking plasticized PVC, and served as the carrier for pigments (if present). The surface layer on the outside of the blown bubble construction provided a receptor layer for a subsequently-applied layer of pressure sensitive adhesive (PSA). The surface layer on the inside of the blown bubble provided a receptor layer for subsequently-applied decorative inks and clear coats. All blends for the core layer and surface layers were compounded and pelletized prior to extrusion of the blown film. The white core layer of sample 14-6 was compounded in a BUSS KNEADER™ reciprocating extruder. The remaining film layers were compounded in a 40 mm BERSTORFF™ co-rotating twin-screw extruder having a 26:1 length to diameter ratio.

The films were extruded through a nominal 101.6 mm diameter annular blown film die fed by three single-screw extruders set up to deliver the core layer and surface layer blends. The pressures and temperatures were rates were adjusted to provide a 15% outer surface layer/70% core layer/15% inner surface layer construction. The bubble take up speed and bubble pressure were adjusted to give nominal MD×TD orientation ratios of either 9×3 or 5.5×3. Set out below in Table V are the run number, composition of each layer, overall film thickness and film orientation ratios for each film.

TABLE V

| Film Number | Film Type | Core Layer (70 wt %) | PSA Receptor Layer (15 wt %) | Ink Receptor Layer (15 wt %) | Film Thickness (mm) |
|---|---|---|---|---|---|
| 14-1 | clear | 74.7% NUCREL 1202HC[1] | 72.0% BYNEL 3101[4] | 68.3% BYNEL 3101 | 0.06 |
|  |  | 24.9% REGALITE T-1140[2] | 24.0% MACROMELT 6239[5] | 19.2% ELVALOY 741[7] |  |
|  |  | 0.4% CHIMASSORB 944[3] | 4.0% UV10407[6] | 3.5% UV10407 |  |
|  |  |  |  | 7.0% ABC-5000[8] |  |
| 14-2 | clear | 74.7% NUCREL 1202HC | 72.0% BYNEL 3101 | 52.5% BYNEL 3101 | 0.06 |
|  |  | 24.9% REGALITE T-1140 | 24.0% MACROMELT 6239 | 35.0% ELVALOY 741 |  |
|  |  | 0.4% CHIMASSORB 944 | 4.0% UV10407 | 3.5% UV10407 |  |
|  |  |  |  | 7.0% ABC-5000 |  |
| 14-3 | Clear | 74.7% NUCREL 1202HC | 72.0% BYNEL 3101 | 74.3% NUCREL 1202HC | 0.06 |
|  |  | 24.9% REGALITE T-1140 | 24.0% MACROMELT 6239 | 9.2% MACROMELT 6239 |  |
|  |  | 0.4% CHIMASSORB 944 | 4.0% UV10407 | 3.7% UV10407 |  |
|  |  |  |  | 4.6% ABC-5000 |  |
| 14-4 | Black | 67.4% NUCREL 1202HC | 72.0% BYNEL 3101 | 68.3% BYNEL 3101 | 0.10 |
|  |  | 24.2% REGALITE T-1140 | 24.0% MACROMELT 6239 | 19.2% ELVALOY 741 |  |
|  |  | 8.0% BLACK PEC[9] | 4.0% UV10407 | 3.5% UV10407 |  |
|  |  | 0.4% CHIMASSORB 944 |  | 7.0% ABC-5000 |  |
| 14-5 | Black | 67.4% SURLYN 1705-1[10] | 72.0% BYNEL 3101 | 68.3% BYNEL 3101 | 0.10 |
|  |  | 24.2% REGALITE T-1140 | 24.0% MACROMELT 6239 | 19.2% ELVALOY 741 |  |
|  |  | 8.0% BLACK PEC | 4.0% UV10407 | 3.5% UV16407 |  |
|  |  | 0.4% CHIMASSORB 944 |  | 7.0% ABC-5000 |  |
| 14-6 | White | 55.9% SURLYN 1705-1 | 72.0% BYNEL 3101 | 74.3% NUCREL 1202HC | 0.06 |
|  |  | 18.7% REGALITE T-1140 | 24.0% MACROMELT 6239 | 9.2% MACROMELT 6239 |  |

TABLE V-continued

| Film Number | Film Type | Core Layer (70 wt %) | PSA Receptor Layer (15 wt %) | Ink Receptor Layer (15 wt %) | Film Thickness (mm) |
|---|---|---|---|---|---|
| | | 25.0% TI-PURE R105[11] 0.4% CHIMASSORB 944 | 4.0% UV10407 | 3.7% UV10407 4.6% ABC-5000 | |

[1]Poly(ethylene co-methacrylic acid), Dupont Packaging
[2]Hydrocarbon resin, Hercules Resins
[3]Hindered amine light stabilizer, Ciba Specialty Chemicals
[4]Acid/acrylate modified poly(ethylene co-vinyl acetate), Dupont Packaging
[5]Polyamide resin, Henkel
[6]Light stabilizer concentrate, Ampecet Corp.
[7]Carbon monoxide modified poly(ethylene co-vinyl acetate), E. I. duPont de Nemours and Co.
[8]Anti-blocking agent, Polyfil Corp.
[9]Carbon black concentrate, PolyOne Corp.
[10]Ionomer based on poly(ethylene co-methacrylic acid), DuPont Packaging
[11]$TiO_2$ pigment, E. I. duPont de Nemours and Co.

A number of performance characteristics were evaluated for each film sample. Two plasticized PVC films (referred to as films "PVC-1" and "PVC-2") currently used in automotive applications and having respective film thicknesses of 0.05 mm and 0.09 mm were similarly evaluated. Young's modulus and elongation to break were measured using a tensile to break test similar to that used in Example 2. However, the tensile tester was operated at a reduced crosshead speed of 152.4 mm/min. (300%/min. instead of 600%/min.) after 1% strain and until the sample failed. Residual stress was measured using a stress relaxation test similar to that used in Example 2. However, the film samples were stress relaxed after an elongation of 10% instead of 100%, and a crosshead speed of 152.4 mm/min. was employed instead of 305 mm/min.

Set out below in Table VI are the run number, film thickness, Young's modulus, elongation at break, and residual stress for each material.

TABLE VI

| | | Tensile Test | | | | Stress | |
|---|---|---|---|---|---|---|---|
| | | Young's Modulus (MPa) | | Break Elongation (%) | | Relaxation Residual Stress (MPa) | |
| Run No. | Film Thickness | MD | TD | MD | TD | MD | TD |
| 14-1 | 2.4 | 268 | 274 | 373 | 364 | 4.69 | 4.18 |
| 14-2 | 2.4 | 248 | 281 | 338 | 385 | 4.50 | 4.15 |
| 14-3 | 2.4 | 260 | 237 | 300 | 371 | 5.73 | 5.65 |
| 14-4 | 4.0 | 246 | 230 | 422 | 378 | 4.46 | 4.49 |
| 14-5 | 4.0 | 285 | 249 | 362 | 348 | 4.73 | 4.32 |
| 14-6 | 2.4 | 352 | 340 | 212 | 224 | 6.30 | 5.64 |
| PVC-1 | 2.4 | 620 | 620 | 152 | 152 | 7.83 | 7.83 |
| PVC-2 | 4.0 | 756 | 756 | 242 | 242 | — | — |

EXAMPLE 15

A polyolefin (EXACT™ 3024, Exxon Chemical Products) and a hydrocarbon resin (REGALITE™ V3120, Hercules, Inc.) were mixed in selected proportions using a BRABENDER mixing head to formulate individual blends containing 0%, 10%, 30% or 50% hydrocarbon resin. Each blend was then pressed and quenched to form a clear homogenous film between 0.2 and 0.4 mm thick.

Strain recovery was characterized for each of the blends approximately four hours and two days after blend formation. At both the four hour and two day intervals, three 10 mm wide by approximately 150 mm long test strips were cut from each film. Two fiducial lines were drawn on each test strip 50 mm apart. The test strips were mounted into the test grips of a mechanical tensile tester (SINTECH™, MTS Systems Corp.) whose test grips had been set 60 mm apart, so that the fiducial lines were equidistant from the nearest test grip. An elongation of 100% was imparted to each test strip at a crosshead speed of 1000 mm/min. Immediately after elongation, the test strips were removed from the test grips and allowed to relax unrestrained at room temperature. After 5 minutes of relaxation, the distance L between the fiducial marks was recorded. The three test strip measurements for each blend were averaged and the strain recovery was calculated according to formula % Strain Recovery 100%×(100-L)/50. Set out below in Table VII are the run number, % polyolefin/ % hydrocarbon resin, and the calculated strain recovery values four hours and two days after blend formation.

TABLE VII

| Run No. | % Polyolefin/% Hydrocarbon Resin | Four Hour Strain Recovery, % | Two Day Strain Recovery, % |
|---|---|---|---|
| 15-1 | 100/0 | 56.7 | 58.0 |
| 15-2 | 90/10 | 72.0 | 58.0 |
| 15-3 | 70/30 | 64.6 | 39.3 |
| 15-4 | 50/50 | 18.7 | 2.7 |

Thus, for these samples, the unoriented films of Run Nos. 15-1 through 15-3 initially exhibited more than 50% strain recovery, and the film of Run No. 15-4 initially exhibited less than 50% strain recovery. However, when the films were allowed to age for two days before making physical property measurements, then the films of Run Nos. 15-3 and 15-4 exhibited less than 50% strain recovery. These strain recovery values should drop further following additional aging, albeit at a reduced rate of change.

In Japanese Published Patent Application No. HEI 2000-273250, several unoriented blended films are reported in Table II and several comparison unoriented films are reported in Table III. The time delay, if any, between film formation and physical property measurement was not reported. These reported films are said to have minute "Elastic Recovery" values (calculated using the formula "elastic recovery (%)=((L1-50)/50×100" where L1 is the distance between fiducial indicator lines 5 minutes after release) of from 13.2 to 38.5 in the machine direction and from 13.4 to 39.5 in the transverse direction. Converting these values to strain recovery values using the formula shown above, the reported films of HEI 2000-273250 had strain recovery values of from 61.5 to 86.8 in the machine direction and from 60.5 to 86.6 in the transverse direction. These reported films were thus elastomeric films as defined above.

EXAMPLE 16

Figure 14:
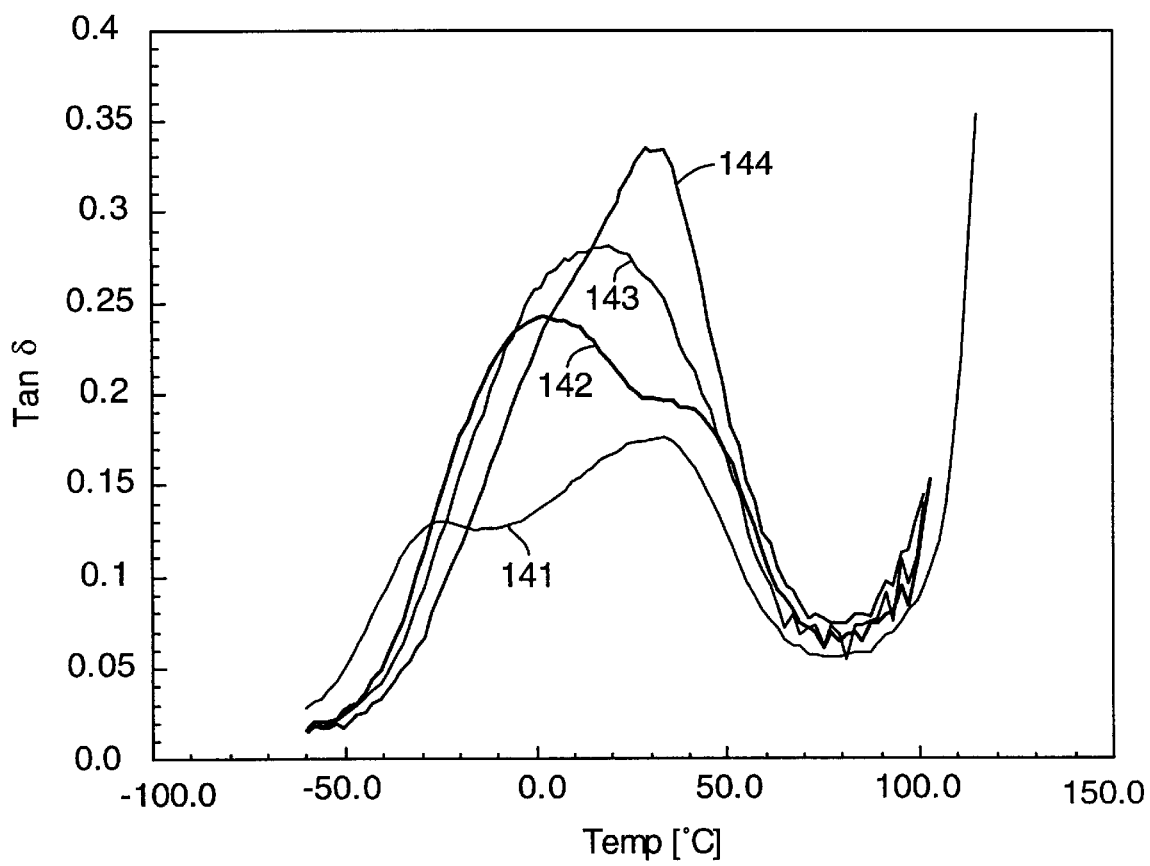
FIG. 14 is a graph illustrating Tan δ vs. temperature for various blends of polyolefin and hydrocarbon resin.

Using the method of Example 15, a polyolefin (ATTANE™ 4404, Dow Chemical Co.) and a hydrocarbon resin (REGALITE™ V3 120, Hercules, Inc.) were mixed in selected proportions using a BRABENDER mixing head to formulate individual blends containing 0%, 20%, 25% or 30% hydrocarbon resin. Each blend was then pressed and quenched to form a clear homogenous film between 0.2 and 0.4 mm thick. Using the method of Example 1, the Tg of each of the films was evaluated. Curves 141, 142, 143, and 144 in FIG. 14 show the resulting dynamic mechanical analysis (DMA) curves illustrating Tan δ vs. temperature for 100% polyolefin (curve 141) and for blends containing 20%, 25% and 30% hydrocarbon resin (curves 142, 143 and 144, respectively). The pure polyolefin exhibited two Tan δ peaks, suggesting the existence of phase separation. As an increasing amount of the hydrocarbon resin was added to the polyolefin, the two tan delta peaks collapsed into a single symmetric peak, indicative of improved optical properties and reduced haze for the resulting film. Thus the hydrocarbon resin may act as a compatibilizer and inhibit phase separation.

Various modifications and alterations of this invention will be apparent to those skilled in the art without departing from the scope and spirit of this invention. This invention should not be restricted to that set forth herein for illustrative purposes only.

We claim:

1. A blend comprising polyolefin and hydrocarbon resin, wherein the polyolefin is semicrystalline and has a suitable degree of crystallinity and molecular weight, or the polyolefin is amorphous and has sufficiently high molecular weight, and sufficient hydrocarbon resin is present in the blend, so that a 0.05 to 0.1 mm thick film made from the blend and aged at least 7 to 10 days is substantially non-elastomeric and resembles a plasticized polyvinyl chloride film sample of similar caliper when placed between a thumb and index finger and flexed or otherwise felt by hand at room temperature.

2. A blend according to claim 1, wherein the film is also conformable, drapable or affinely deformable by hand.

3. A blend according to claim 1, wherein the film is also conformable, drapable and affinely deformable by hand.

4. A blend according to claim 1, wherein the film has a deformation index that is less than about 1.1.

5. A blend according to claim 1, wherein the film is dead-stretchable by hand at low elongation rates.

6. A blend according to claim 1, wherein the film is tearable by hand at high elongation rates.

7. A film comprising a blend according to claim 1.

8. A film according to claim 7, wherein the film is oriented.

9. A film according to claim 8, wherein the orientation is biaxial at an orientation ratio of at least about 2×2.

10. A film according to claim 8, wherein the orientation is biaxial at an orientation ratio of at least about 4×4.

11. A film according to claim 7, wherein the film has a deformation index less than about 1.1.

12. A film according to claim 7, wherein the film has a deformation index less than about 1.05.

13. A film according to claim 7, wherein the film is substantially isotropic in two orthogonal directions in the plane of the film.

14. A film according to claim 7, wherein the film is clear and non-hazy.

15. A film according to claim 7, wherein the blend is ink-receptive.

16. A film according to claim 7, wherein the film comprises a multilayer film having a layer or layers comprising the blend and one or more additional layers.

17. A film according to claim 16, wherein at least one of the additional layers comprises an ink-receptive layer.

18. A film according to claim 16, wherein at least one of the additional layers comprises an adhesive.

19. A film according to claim 16, wherein at least one of the additional layers is scratch-resistant.

20. A film according to claim 7, wherein the film is sewable, launderable and weldable.

21. A film according to claim 7, wherein the film is non-blocking.

22. A blend according to claim 1, in the form of a fiber.

23. A blend according to claim 1, comprising at least about 20 wt. % hydrocarbon resin.

24. A blend according to claim 1, wherein the blend comprises at least about 40 wt. % hydrocarbon resin.

25. A blend according to claim 1, wherein the blend comprises at least about 50 wt. % hydrocarbon resin.

26. A blend according to claim 1, wherein the blend comprises at least about 60 wt. % hydrocarbon resin.

27. A blend according to claim 1, wherein the blend comprises about 40 to about 60 wt. % hydrocarbon resin.

28. A non-elastomeric film comprising a blend of hydrocarbon resin together with semicrystalline or amorphous polyolefin, or a mixture thereof, the blend being such that a 0.05 to 0.1 mm thick film made from the blend and aged at least 7 to 10 days resembles a plasticized polyvinyl chloride film sample of similar caliper when placed between a thumb and index finger and flexed or otherwise felt by hand at room temperature.

29. A film according to claim 28, wherein the polyolefin comprises an ethylene or propylene copolymer, a mixed tacticity polypropylene, or a blend thereof.

30. A film according to claim 29, wherein the polyolefin comprises an ethylene/butene, ethylene/hexene or ethylene/octene copolymer.

31. A film according to claim 28, wherein the polyolefin is an ethylene copolymer.

32. A film according to claim 28, wherein the polyolefin is a propylene copolymer.

33. A film according to claim 28, comprising a graphic marking film comprising an adhesive layer and a release liner.

34. A film according to claim 33, further comprising an image receptive layer.

35. A film according to claim 34, wherein the image receptive layer comprises an ink receptive layer.

36. A film according to claim 33, further comprising an image.

37. A film according to claim 36, further comprising a protective overlayer.

38. A film according to claim 28, comprising a tape backing and an adhesive layer.

39. A film according to claim 24, comprising a layer of retroreflective elements.

40. A film according to claim 38, further comprising a gloss layer.

41. A film according to claim 38, further comprising a colored layer.

42. A film according to claim 28, wherein the film is conformable, drapable or affinely deformable by hand.

43. A film according to claim 28, wherein the film is conformable, drapable and affinely deformable by hand.

44. A method for making a film comprising blending, extruding and optionally orienting a mixture comprising polyolefin and hydrocarbon r wherein the polyolefin is semicrystalline and has a suitable degree of crystallinity and molecular weight, or the polyolefin is amorphous and has sufficiently high molecular weight, and wherein sufficient hydrocarbon resin is present in the mixture, so that a 0.05 to 0.1 mm thick film made from the mixture and aged at least 7 to 10 days is substantially nonelastomeric and resembles a plasticized polyvinyl chloride film sample of similar caliper when placed between a thumb and index finger and flexed or otherwise felt by hand at room temperature.

45. A method according to claim 44, wherein the film is conformable, drapable or affinely deformable by hand.

46. A method according to claim 44, wherein the film is confirmable, drapable and affinely deformable by hand.

47. A method according to claim 44, wherein the film is oriented.

48. A method according to claim 47, wherein the orientation step comprises orienting the film sufficiently so that it has a deformation index less than about 1.1.

49. A method according to claim 47, wherein the orientation step comprises orienting the film sufficiently so that it has a deformation index less than about 1.05.

50. A method according to claim 47, wherein the orientation is biaxial at an orientation ratio of at least about 2×2.

51. A method according to claim 47, wherein the orientation is biaxial at an orientation ratio of at least about 4×4.

52. A method according to claim 47, wherein the orientation is by blowing a tube of the film to increase the diameter of the tube.

53. A method according to claim 44, wherein the blend comprises at least about 20 wt. % hydrocarbon resin.

54. A method according to claim 44, wherein the blend comprises at least about 40 wt. % hydrocarbon resin.

55. A method according to claim 44, wherein the blend comprises at least about 50 wt. % hydrocarbon resin.

56. A method according to claim 44, wherein the blend comprises at least about 60 wt. % hydrocarbon resin.

57. A method according to claim 44, wherein the blend comprises about 40 to about 60 wt. % hydrocarbon resin.

58. A method according to claim 46, further comprising surface-treating the film in order to enhance adhesion of an adhesive layer thereto.

59. A method according to claim 44, further comprising forming on e or more additional layers on the film.

60. A method according to claim 44, further comprising forming one or more tie layers and one or more additional layers on the film.

61. A method according to claim 44, further comprising adding to the mixture one or more of an antioxidant, UV absorber or light stabilizer, so that a film made from the mixture maintains its color, elongation or gloss after extended exposure to outdoor conditions.

* * * * *

UNITED STATES PATENT AND TRADEMARK OFFICE
CERTIFICATE OF CORRECTION

PATENT NO. : 6,531,214 B2
DATED : March 11, 2003
INVENTOR(S) : Carter, Brandt K.

It is certified that error appears in the above-identified patent and that said Letters Patent is hereby corrected as shown below:

Column 3,
Line 1, delete "." following "illustrated."

Column 4,
Line 34, delete ":" following "to".
Line 35, delete ";" following "of".

Column 5,
Line 38, delete "of should be" following "and."

Column 6,
Line 40, "ENDEXT" should read -- ENDEX --.

Column 7,
Line 42, "eluated" should read -- evaluated --.

Column 13,
Line 21, "homogenous" should read -- homogeneous --.
Line 50, "calendaring" should read -- calendering --.
Line 65, insert -- at -- following "out."

Column 14,
Line 38, "vinylcoated" should read -- vinyl-coated --.
Line 45, "abovementioned" should read -- above-mentioned --.
Line 53, "ore" should read -- core --.

Column 15,
Line 45, delete "." following "moduli."

Column 18,
Line 30, "confonn" should read -- conform --.

UNITED STATES PATENT AND TRADEMARK OFFICE
CERTIFICATE OF CORRECTION

PATENT NO. : 6,531,214 B2
DATED : March 11, 2003
INVENTOR(S) : Carter, Brandt K.

It is certified that error appears in the above-identified patent and that said Letters Patent is hereby corrected as shown below:

Column 19,
Line 2, "PNO9-200" should read -- PN 09-200 --.

Column 20,
Line 2, "HOSTASOLT" should read -- HOSTASOL --.
Line 23, "C165A" should read -- CI 65A --.
Line 59, "CHIMASORB" should read -- CHIMASSORB --.

Column 21,
Line 44, delete "a" preceding "calculated."

Column 22,
Lines 51, 59 and 65, "3336" should read -- 3346 --.

Column 24,
Line 12, "of0.10" should read -- of 0.10 --.
Line 33, delete "were" preceding "rates."
Table V, "UV16407" should read -- UV10407 --.

Column 25,
Line 62, "homogenous" should read -- homogeneous --.

Column 26,
Line 29, insert -- = -- following "Recovery."
Line 57, insert -- 5 -- following "have."

Column 27,
Line 3, "V3 120" should read -- V3120 --.
Line 8, "homogenous" should read -- homogeneous --.

Column 28,
Line 56, "24" should read -- 8 --.

UNITED STATES PATENT AND TRADEMARK OFFICE
CERTIFICATE OF CORRECTION

PATENT NO. : 6,531,214 B2
DATED : March 11, 2003
INVENTOR(S) : Carter, Brandt K.

It is certified that error appears in the above-identified patent and that said Letters Patent is hereby corrected as shown below:

Column 29,
Line 1, "r" should read -- resin, --.
Line 7, "nonelastomeric" should read -- non-elastomeric --.
Line 14, "confirmable" should read -- conformable --.

Column 30,
Line 13, "46" should read -- 44 --.
Line 17, "on e" should read -- one --.

Signed and Sealed this

Eighth Day of June, 2004

JON W. DUDAS
*Acting Director of the United States Patent and Trademark Office*